United States Patent
Singh

(10) Patent No.: US 10,778,588 B1
(45) Date of Patent: *Sep. 15, 2020

(54) LOAD BALANCING FOR MULTIPATH GROUPS ROUTED FLOWS BY RE-ASSOCIATING ROUTES TO MULTIPATH GROUPS

(71) Applicant: Amazon Technologies, Inc., Seattle, WA (US)

(72) Inventor: Bijendra Singh, Cedar Park, TX (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/153,668

(22) Filed: Oct. 5, 2018

Related U.S. Application Data

(63) Continuation of application No. 15/235,007, filed on Aug. 11, 2016, now Pat. No. 10,097,467.

(51) Int. Cl.
| | | |
|---|---|---|
| *H04L 12/803* | (2013.01) | |
| *H04L 12/18* | (2006.01) | |
| *H04L 12/761* | (2013.01) | |

(52) U.S. Cl.
CPC ............ *H04L 47/125* (2013.01); *H04L 12/18* (2013.01); *H04L 45/16* (2013.01)

(58) Field of Classification Search
CPC ..... G06F 17/145; H04J 11/00; H04J 13/0048; H04J 2011/0003; H04J 2011/0006; H04J 2011/0009; H04J 2011/0013; H04J 2011/0016; H04J 2011/002; H04L 47/10; H04L 47/12; H04L 47/20; H04L 47/24; H04L 47/32; H04L 47/38; H04L 47/70;
(Continued)

(56) References Cited

U.S. PATENT DOCUMENTS

| 6,173,384 B1 | 1/2001 | Weaver |
| 6,987,732 B2 | 1/2006 | Gracon et al. |

(Continued)

OTHER PUBLICATIONS

U.S. Appl. No. 16/165,082, U.S. Patent Application, "Load Balancing for Multipath Group Routed Flows by Rerouting the Congested Route," filed Oct. 19, 2018.
(Continued)

*Primary Examiner* — Dady Chery
(74) *Attorney, Agent, or Firm* — Kilpatrick Townsend & Stockton LLP

(57) ABSTRACT

Disclosed are techniques regarding interfaces, each configured to output network packets. The techniques can include a memory storing a first multipath group associated with the interfaces and a routing table containing routes to the first multipath group. The techniques can further include congestion detection logic configured to determine that an interface of the first multipath group is congested from a flow of network packets, the flow of network packets directed to the first multipath group from a route of the routing table. The techniques can additionally include congestion avoidance logic configured to, upon determining that the interface of the first multipath group is congested, dissociate the route from the first multipath group and associate the route with a second multipath group, the second multipath group associated with the interfaces of the first multipath group.

22 Claims, 17 Drawing Sheets

(58) Field of Classification Search
CPC ......... H04L 47/72; H04L 47/74; H04L 47/78;
H04L 47/80; H04L 47/22; H04L 47/225;
H04L 47/18; H04L 47/52; H04L 47/125;
H04L 45/16; H04L 12/18; H04L 12/1886;
H04L 12/1877; H04W 28/02; H04W
28/0257; H04W 28/0263; H04W 28/0268;
H04W 28/0273
See application file for complete search history.

(56) References Cited

U.S. PATENT DOCUMENTS

| | | | |
|---|---|---|---|
| 7,046,687 | B1 | 5/2006 | Brown et al. |
| 7,324,553 | B1 | 1/2008 | Varier et al. |
| 8,279,867 | B2 | 10/2012 | Carley |
| 8,797,877 | B1 | 8/2014 | Perla et al. |
| 9,473,408 | B1 | 10/2016 | Kabbani et al. |
| 10,009,275 | B1 | 6/2018 | Singh |
| 10,015,096 | B1 | 7/2018 | Singh |
| 10,105,096 | B2 | 10/2018 | Morishita |
| 2004/0170133 | A1 | 9/2004 | Oguchi et al. |
| 2007/0237074 | A1 | 10/2007 | Curry |
| 2009/0234908 | A1 | 9/2009 | Reyhner et al. |
| 2011/0069711 | A1 | 3/2011 | Jha et al. |
| 2012/0155468 | A1 | 6/2012 | Greenberg et al. |
| 2013/0097403 | A1 | 4/2013 | Zheng et al. |
| 2013/0156036 | A1 | 6/2013 | Basso et al. |
| 2015/0326476 | A1* | 11/2015 | Ye .......................... H04L 47/12 370/235 |
| 2016/0081005 | A1 | 3/2016 | Patil et al. |
| 2017/0005931 | A1 | 1/2017 | Mehta et al. |
| 2017/0346737 | A1 | 11/2017 | Previdi et al. |

OTHER PUBLICATIONS

U.S. Appl. No. 15/187,486, U.S. Patent Application, "Congestion Avoidance in Multipath Routed Flows," filed Jun. 20, 2016.

U.S. Appl. No. 15/232,727, U.S. Patent Application, "Congestion Avoidance in Multipath Routed Flows Using Virtual Output Queue Statistics," filed Aug. 9, 2016.

U.S. Appl. No. 15/234,996, U.S. Patent Application, "Load Balancing for Multipath Group Routed Flows by Rerouting the Congested Route," filed Aug. 11, 2016.

U.S. Appl. No. 15/235,007, "Non-Final Office Action," dated Feb. 8, 2018, 12 pages.

U.S. Appl. No. 15/235,007, "Notice of Allowance," dated Jun. 14, 2018, 5 pages.

U.S. Appl. No. 15/352,442, U.S. Patent Application, "Uniform Route Distribution for a Forwarding Table," filed Nov. 15, 2016.

U.S. Appl. No. 16/015,846, U.S. Patent Application, "Uniform Route Distribution for a Forwarding Table," filed Jun. 22, 2018.

U.S. Appl. No. 16/024,139, U.S. Patent Application, "Congestion Avoidance in Multipath Routed Flows," filed Jun. 29, 2018.

U.S. Appl. No. 16/118,310, U.S. Patent Application, "Congestion Avoidance in Multipath Routed Flows Using Virtual Output Queue Statistics," filed Aug. 30, 2018.

\* cited by examiner

| Route ID 1118 | Enable 1104 | Triggered 1106 | Flow 1 Hit Count 1108 | Flow 1 Hash Value 1110 | Flow 2 Hit Count 1112 | Flow 2 Hash Value 1114 | Interface ID 1116 | Timer 1120 |
|---|---|---|---|---|---|---|---|---|

Multipath Group 1102

LOAD BALANCING FOR MULTIPATH GROUPS ROUTED FLOWS BY RE-ASSOCIATING ROUTES TO MULTIPATH GROUPS

CROSS REFERENCE TO RELATED APPLICATIONS

This application is a continuation of U.S. Non-Provisional patent application Ser. No. 15/235,007, filed Aug. 11, 2016, issued as U.S. Pat. No. 10,097,467 on Oct. 9, 2018, and entitled "LOAD BALANCING FOR MULTIPATH GROUPS ROUTED FLOWS BY RE-ASSOCIATING ROUTES TO MULTIPATH GROUPS," the content of which is herein incorporated by reference in its entirety.

BACKGROUND

A network device, such as a router or a switch in a network infrastructure system can receive network packets from a number of ingress interfaces and forward the network packets via one of a number of egress interfaces. The network device can select an egress interface for forwarding of a specific network packet depending upon, for example, destination address information included in the network packet. In certain network devices, output interfaces can be grouped into multipath groups. Routing of network packets can include selecting a route from a routing table. The routing table can include a plurality of routes, each corresponding to an interface, a multipath group, or other egress avenue for a network packet from a network device. If too many network packets are routed to a single interface, the interface can become congested. Congestion can take the form of dropped network packets or delays in forwarding of a network packet. Thus, there is need for improvement in the field of network devices.

BRIEF DESCRIPTION OF THE DRAWINGS

Various embodiments in accordance with the present disclosure will be described with reference to the drawings, in which:

FIG. 11 illustrates a congestion control block according to certain embodiments.

DETAILED DESCRIPTION

Figure 1:
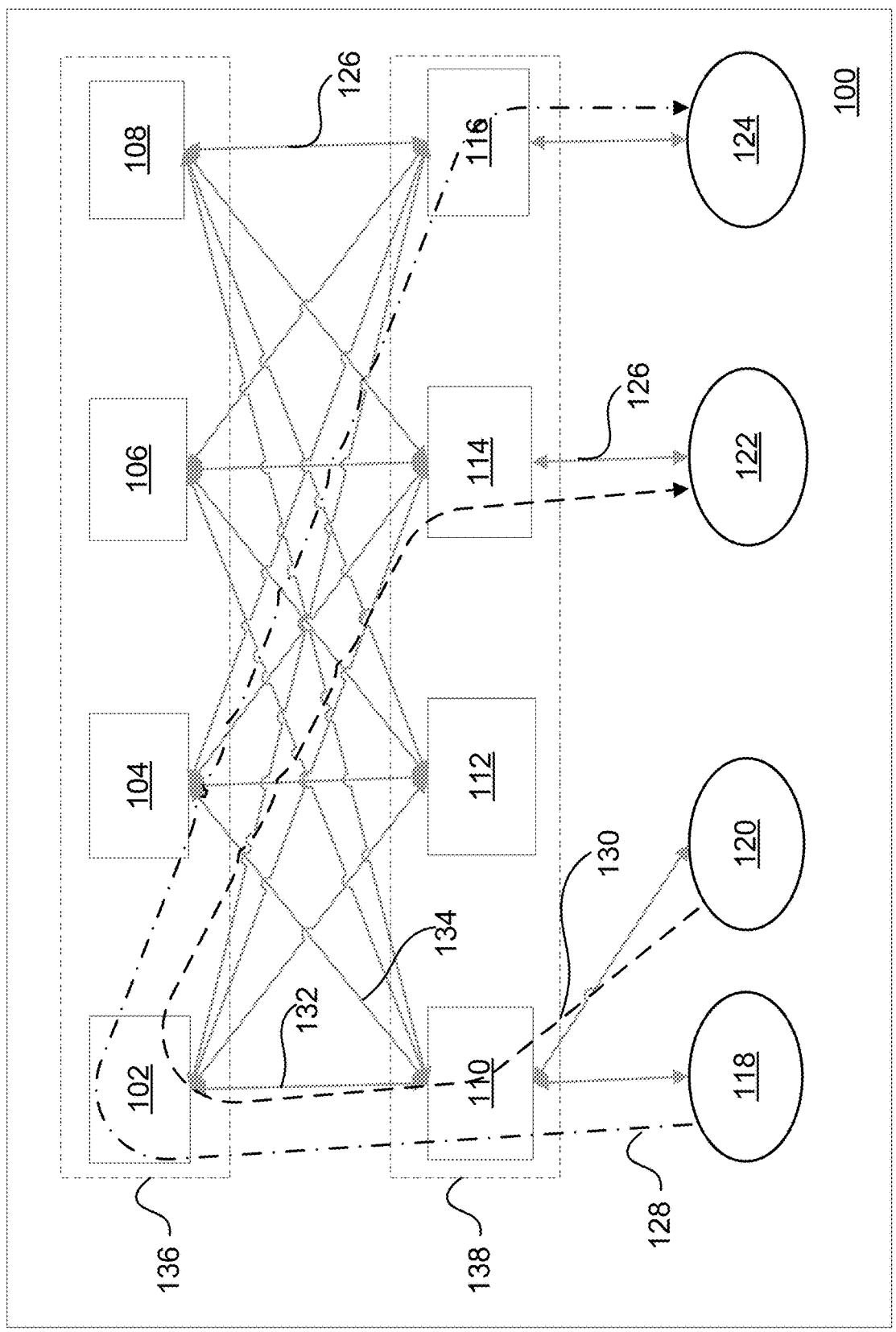
FIG. 1 illustrates a network infrastructure according to certain embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

A network device, such as a router or a switch in a network system can receive network packets from a number of ingress interfaces and forward the packets via a number of egress interfaces. The network device can determine which egress interface is to be used for forwarding of specific network packets depending upon, for example, destination address information included in the data packets (e.g., within a header of a network packet). In certain embodiments, a routing table (also known as a forwarding table) can be used as an index to determine an egress interface for output of a network packet. A routing table can include a plurality of routes, each route corresponding to a respective egress interface, plurality of egress interfaces, or other egress avenue for a network packet from a network device. As used herein, a route may be a reference used by a network device to select an egress interface from a plurality of egress interfaces. A route can include a destination Internet Protocol (IP) address, Virtual Routing and Forwarding (VRF), or other information to be matched to a network packet for routing. A route can also indicate a path between two or more network devices. In some instances, the router uses the routes in the routing table to determine the next hop or next device for a network packet by using information from the network packet and routing information in the routes of the routing table. The term "routing" can indicate the process of selecting an egress interface or a path for transmitting a network packet between two network devices in a network infrastructure. Routing can include selection of an egress interface or other egress avenue based on IP address information in a header and/or footer of an encapsulated network packet. The term "interface" means a device's connection between two pieces of equipment or protocol layers in a computer network. An interface can be a physical interface (between two devices) or a logical interface (between two protocol layers). An interface can be a physical port of a network device (for input and/or output of network packets), a logical port of a network device, or other port.

In certain instances, a route can correspond to a plurality of egress interfaces. The plurality of egress interfaces can be grouped together to form a multipath group. Each interface within a multipath group can be selected for inclusion within a multipath group if each interface shares certain characteristics. For example, each interface within a multipath group can indicate an equal cost of forwarding a network packet to a certain network device. By grouping these interfaces, selection from a route to the multipath group can be simplified (e.g., instead of including a route to each interface, a single route can exist pointing to a multipath group wherein the multipath group includes multiple interfaces). A multipath group wherein each interface has been determined to correspond to an equal cost (e.g., latency or bandwidth) can be referred to as an Equal-Cost Multi-Path (ECMP) group. Another example of a multipath group is a Weighted-Cost Multi-Path (WCMP) group.

Selection of a route from a routing table can be accomplished in a variety of manners. In certain embodiments, hashing techniques can be used to select one route from many. Hashing techniques can use mathematical rules (modulus operation(s), for example) to select a route using information associated with a specific network packet. For example, a source and/or destination address can be hashed to select a route from a routing table. In certain embodiments, the hashing techniques can include Longest Prefix Match (LPM) techniques. A destination IP address, for example, may contain an increasingly specific destination address depending upon a number of bits contained therein. Using LMP techniques, a more specific matching route can be selected by determining a most specific route (i.e., a route with a largest number of bits) within a routing table corresponds to a network packet for routing of the network packet.

Sometimes, multiple routes in a routing table can point to a single multipath group. Network packets received by a network device having a same or similar source and/or destination address can be referred to as belonging to a flow of network packets. If a relatively large number of network packets are routed via a same egress interface, the egress interface can experience congestion. In such instances, the egress interface can become saturated, leading to dropped network packets and/or inefficient utilization of network resources. As used herein, the term "elephant flow" refers to a flow of packets having a relatively large number of network packets from a same source to a same destination. When two or more elephant flows are routed via a same egress interface, a network device can experience congestion at that egress interface. In some embodiments, elephant flows can be directed to an interface via two or more separate routes in a routing table. Each of these routes may point to one multipath group.

Disclosed herein are techniques to identify whether an egress interface is congested from flow(s) of network packets from multiple routes to a multipath group (e.g., multiple routes are selected from a routing table for flow(s) of network packets contributing to congestion). The techniques disclosed enable a network device to gather information pertaining to network flows instead of just network packets. Furthermore, techniques are disclosed to reroute flows of network packets that are identified as contributing to congestion and associated with multiple routes to a multipath group. The techniques disclosed can efficiently utilize network resources by distributing flows of network packets across egress ports of a network device to alleviate congestion determined at certain egress interface(s).

FIG. 1 illustrates a network infrastructure 100 according to certain embodiments. Network infrastructure 100 includes various network devices, 102-116. Network devices 102-116 are configured to route network packets transferred between devices 118, 120, 122, and 124. Any of network devices 118, 120, 122, and 124 can represent host or client side devices (e.g., network can flow in any direction between the devices). Various paths 126 are illustrated as connecting the network devices 102-116 and devices 118-124.

In network infrastructure 100, network device 110 interfaces to each of network devices 102, 104, 106, and 108. Likewise, each of network devices 112, 114, and 116 interfaces to each of network devices 102, 104, 106, and 108. Thus, network packets can flow directly between any of network devices 102, 104, 106, or 108 to any of network devices 110, 112, 114, or 116. Flow of network packets 128 is illustrated as traversing network infrastructure 100 via path 118-110-102-116-124. Flow of network packets 130 is illustrated as traversing network infrastructure 100 via path 120-110-102-114-122. Although flows of network packets 128 and 130 share resources of several network devices (such as network device 102), congestion may occur at an output port of network device 110, as will be become apparent from the disclosure.

When network device 110 receives a network packet from network device 120, it can route the network packet based on information captained within the network packet (such as a source and/or destination address. For example, the destination of a network packet of flow 130 can indicate that the final destination is 124. Using this information, network device 110 can make a determination that the network packet is to be output to network device 102 as the most efficient next hop destination along its path to ready network device 124. This determination can be made using various techniques of a network device, as disclosed herein. Furthermore, various techniques can be used to determine optimal paths between network devices for network packets to flow through. These techniques can be dynamic and respond to various network conditions.

In certain embodiments, network infrastructure 100 can be a leaf/spine data center network infrastructure. Network devices 102, 104, 106, and 108 can be referred to as a spine layer 136 within neatwork infrastructure 100. Network devices 110, 112, 114, and 116 can be referred to as a leaf layer 138 within network infrastructure. Network infrastructure 100 can be configured such that an equal cost (e.g., with regards to latency) path exists between any two devices of network devices 118, 120, 122, and 124. In such a topology, paths 126 (including 132 and 134) can represent physical links between network devices within network infrastructure 100.

Figure 2:
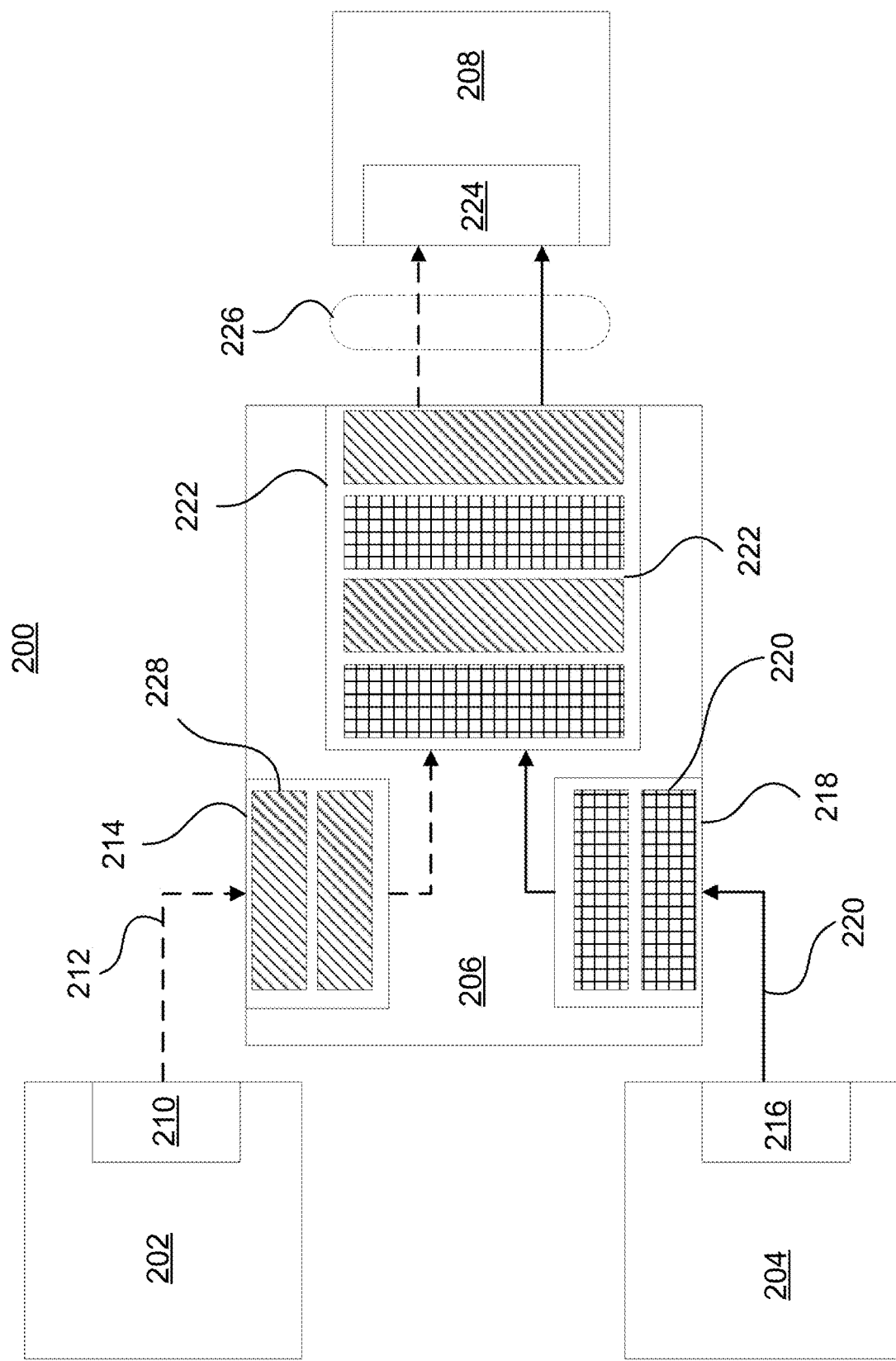
FIG. 2 illustrates network devices to illustrate causes of congestion according to certain embodiments.

FIGS. 2-6 illustrate example network devices that each illustrate various features of a network device. The features illustrated in FIGS. 2-6 can be included within a single network device in any combination. FIG. 2 illustrates an example network infrastructure 200, including network devices 202, 204, 206, and 208. Network infrastructure 200 can be similar to network infrastructure 100. Network devices 202, 204, 206, and 208 are communicatively coupled to enable flow of network packets between the network devices. Network device 206 can include network packet routing functionality wherein network device 206 can receive network packets via an input interface port and route the network packets to an appropriate output interface port. Network devices 202 and 204 include output interface ports 210 and 216 respectively. Network device 208 includes input port 224. Network devices 202, 204, and 208 can be host or client devices, for example (that may or may not include routing functionality).

Network device 206 can be similar in functionality to network device 110. Network device 206 is illustrated as receiving a flow of network packets 212 from network device 202 via input interface port 214. Network device 206 is also illustrated as receiving a flow of network packets 220 from network device 204 via input interface port 218. Each of flows of network packets 212 and 220 include network packets 228 and 220 respectively. As illustrated, network packets 228 can be stored within a buffer of input interface port 214. Network packets 220 can be stored within a buffer of input interface port 218.

Network device 206 is illustrated as routing both flows of network packets 212 and 220 to output port 222 to be output to network device 208 via transmission path 226. Transmission path 226 can be bandwidth limited via physical constraints of the transmission medium, capabilities of output port 222 of network device 206, input port 224 of network device 208, or other. Transmission path 226 and/or transmission paths between network devices 202, 204, and 206 (not shown) can have similar bandwidth transmission capabilities/limitations. As flows of network packets 212 and 220 are routed to output port 222, they may saturate output port 222. As illustrated, output port 222 may include a buffer or queue containing network packets 222 from flows of network packets 212 and 220. The rate at which network packets 222 are added to the queue can exceed the rate at which the network packets can be transmitted to network device 208, resulting in congestion and possible saturation. As illustrated, output port 222 contains twice as many network packets 222 as either input interface port 214 or input interface port 218. If input ports 214 and 218 can receive network packets at rate each equal to a rate at which output port 222 can transmit network packets, then output port 222 can be saturated by receiving twice as many packets as it can transmit.

If transmission path 226 becomes congested, then network infrastructure 200 may encounter delays in network data being transmitted from network device 202 and/or 204 to network device 208. If network infrastructure 200 becomes saturated, network packets can also or alternatively become dropped and not reach their intended destination. It should be understood that, if, for example, input port 228 and output port 210 have similar data transfer bandwidth capabilities, it is unlikely that congestion would occur at input port 228 as the maximum possible amount of data transmitted via output port 210 may equal the maximum possible capability of input port 228 to receive data.

Figure 3:
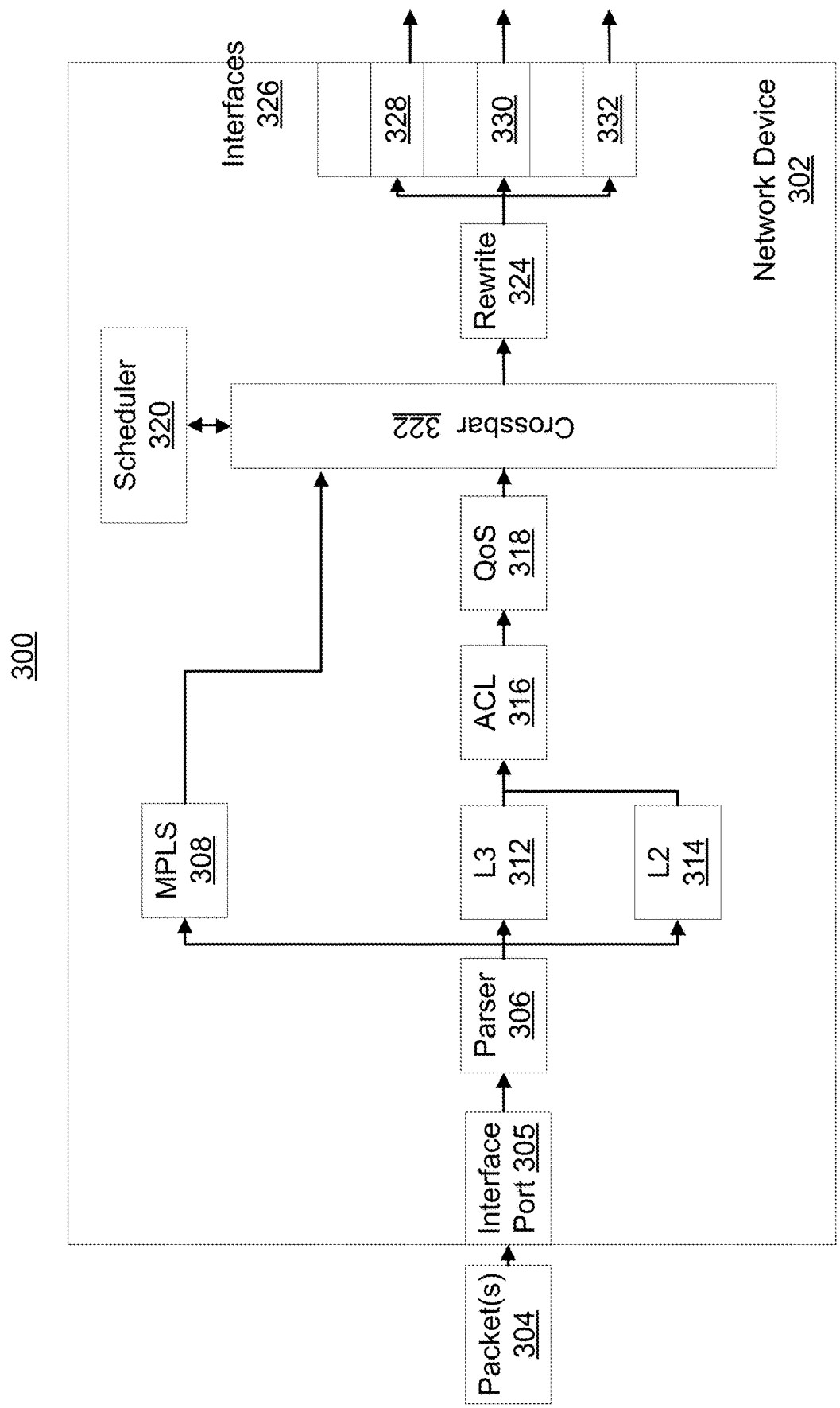
FIG. 3 illustrates a routing pipeline of a network device according to certain embodiments.

FIG. 3 illustrates a logical block diagram 300 illustrating techniques for processing and forwarding of network packets. The techniques of diagram 300 can be implemented by a packet processor of network device 206, for example. The packet processor can also be implemented using pipelined operations to support packet processing speeds for high-speed network data transfer operations, including forwarding information lookups and other packet processing operations. The packet processor can be implemented to provide forwarding of network packets as part of the data plane so that forwarding may be performed without software-based techniques.

Network packet(s) 304 can be received via a network interface, such via interface port 305. Interface port 305 can provide a physical layer (PHY) interface. Media Access Control (MAC) layer interface that can be implemented via interface port 305. Network packet(s) 304 can be analyzed to detect valid flows and segment the flow into datagrams (e.g., packets/frames). For instance, the PHY layer may receive and transmit data across physical connections (e.g., such as electrical signals received over twisted-pair coaxial cable or optical signals received over optical fiber). The PHY layer may implement different techniques dependent on the speed or type of network interface configuration (e.g., ethernet 10 base-T, 100 base-TX, and 100 base-T forms), such as encoding, multiplexing, synchronization, clock recovery, and/or data serialization. Various signaling standards, such as IEEE 802.3, may govern the performance of the PHY layer consistent with the open systems interconnection (OSI) model for communications. The MAC layer may delimit frames and packets from the flow of data. Error checking may also be implemented at the MAC layer, checking for different errors, such as frame check sequence (FCS), interframe gap enforcement, and frame preambles.

Packet parser 306 can receive network packets and separate the packet header from the packet payload. Packet parser 306 can parse the packet header to determine and/or extract data for making forwarding decisions for the packet. For example, packet parser 304 can extract different layer headers (e.g., L2, L3, and L3 headers) included in an Internet protocol (IP) version 3 packet, such as the source MAC address, the destination MAC address, the source IP address, the destination IP address, and port numbers. Using information from the layer headers, the network packets can be forwarded to Multiprotocol Label Switching (MPLS) module 308, Level 3 (L3) routing module 312, or Level 2 (L2) routing module 314. MPLS module 308 can use MPLS techniques to make forwarding decisions based on information in the header, bypassing Open System Interconnection (OSI) L2 and L3 routing decisions.

A network packet can be forwarded to L3 routing module 212 or L2 routing module 314 in order to determine forwarding and tunneling decisions based on information in the packet header (e.g., packet metadata) extracted by packet parser 306. For example, L3 routing module 312 can locate appropriate forwarding information through the use of Forwarding Table(s). Forwarding Table(s) can, in certain embodiments, be logically partitioned within L3 routing module 312. In certain embodiments, information can be organized and located in elements of Forwarding Table(s). L2 routing module 314 can perform lookups for data in layer 2 (L2) portions of the packet to perform L2 forwarding. L2 forwarding may access a MAC address table in forwarding tables (not shown) to perform two lookups (which may be in parallel or in series). These forwarding tables can also benefit from features of the disclosure. The first lookup may be performed with a key extracted from the packet header at packet parser 306 (e.g., a VLAN and source MAC address), to determine whether an entry for the packet is present in Forwarding Table(s). If the source MAC address is unknown, then a mapping determination may be made to map the source MAC address to a port identified in the packet header. If the MAC address is known but attached to a different port than indicated the MAC address table, than an operation may be performed to move the source MAC address to the port identified in the packet header. Otherwise, the MAC address is known in the MAC address table. Another look up to the MAC address table may also be performed at another key (the VLAN in the destination MAC address). The network packet may be routed if the MAC address table contains an entry for the destination MAC address owned by a network device (otherwise other operations may be performed, such as trapping the network packet for the CPU, bridging the packet out of a listing interface, or flooded out of all ports and an STP forwarding state).

L3 routing module 312 can perform lookups for data in layer 3 (L3) portions of the packet to perform L3 forwarding. For example, IP headers for the packet may be evaluated respect to entries and tables such as a routing or next top table, to determine forwarding to be performed. The previous examples of packet forwarding is not exhaustive, as many other forwarding systems may be made, including, but not limited to, forwarding for spanning tree protocol (STP) state checking, access port VLAN handling, VLAN membership checking, MAC2ME lookup, broadcast/multicast forwarding to a host CPU for the switch, tunnel start/termination lookup, longest prefix match, source MAC lookup, learn filtering, learn requests, moved source MAC checking, multiprotocol label switching (MPLS) label lookups, traffic class mapping, time-to-live (TTL) checks, packet actions based on ingress/egress access control lists (ACL), and front/or various other destination resolution lookups. As packet forwarding make forwarding decisions about the packet, the decisions are maintained as packet metadata. The packet metadata can be provided to scheduler 320 for scheduling determinations.

Forwarding Table(s) may be implemented in one or multiple storage devices, such as various memory devices (e.g., a CAM, such as TCAM, and/or random access memory) to store table data for performing different routing decisions. Forwarding Table(s) may include a VLAN table, MAC address table, routing table, adjacency table, next top table, tunnel start table, virtual routing and forwarding identifier table, tunnel termination table, and/or actions table. Each of these different tables may be utilized to retrieve or determine packet forwarding decisions, tunneling decisions, and associated modifications that may need to be made to network packets.

Access Control List module 316 can, based on rules) compare information obtained from a network packet header or elsewhere to make a determination if the network packet header is allowed to be directed to specific destination(s). For example, Access Control List module 316 can include a list of source address(es) of network packets that are allowed to be forwarded to certain address(es). Access Control List module 316 can also include a list of source address(es) of network packets that are not allowed to be forwarded to certain address(es). Additional information can be included within Access Control List module 316 such as protocol version(s), identifying information, or other. After Access Control List module 316 determined whether a specific network packet is approved for forwarding, the network packet can be forwarded to Quality of Service module 318.

Quality of Service module 318 can, based on certain rules, prioritize forwarding of certain network packets over others. For example, certain rules can, based on a QoS policy, can specify that types of packets (such as those associated with video or voice over internet) take priority over other packets (such as for mass file transfers). As another example, a QoS policy can specify that certain users take priority over others. Quality of Service module 318 can withhold certain network packets from proceeding to Crossbar 322. Crossbar 322 can be a switch controlling multiple inputs and multiple outputs. Quality of Service module 318 can comprise multiple queues of output data, each having a different priority. The multiple inputs can each be associated with MPLS module 308, QoS module 318, or other. The multiple outputs can each be associated with an outgoing interface port of Interface ports 326. Illustrated are three example routings of data to interface port 328, interface port 330, and interface port 332 respectively before proceeding to a network device external to network device 302.

Scheduler 320 can control the buffering of packets and scheduling of operations within the network device 302 For example, scheduler 320 can implement a memory management unit to allocate available memory segments for buffering stored packets. Scheduler 320 can also implement a memory management unit to allocate packets from a buffer for final processing and egress. Scheduler 320 can provide the appropriate metadata for a packet. Once a packet has been scheduled, Scheduler 320 can utilize Crossbar 322 and, PHY interface, and/or a MAC layer interface to transmit network packets as network data. Rewrite module 324 can be used to rewrite encapsulation or other information after a packet has traversed crossbar 322, for example. The rewrite module can rewrite encapsulation information to, for example, enable tunneling in the packet, enforce ACL, or appending a next-hop address.

input port 228 to receive data.

Figure 4:
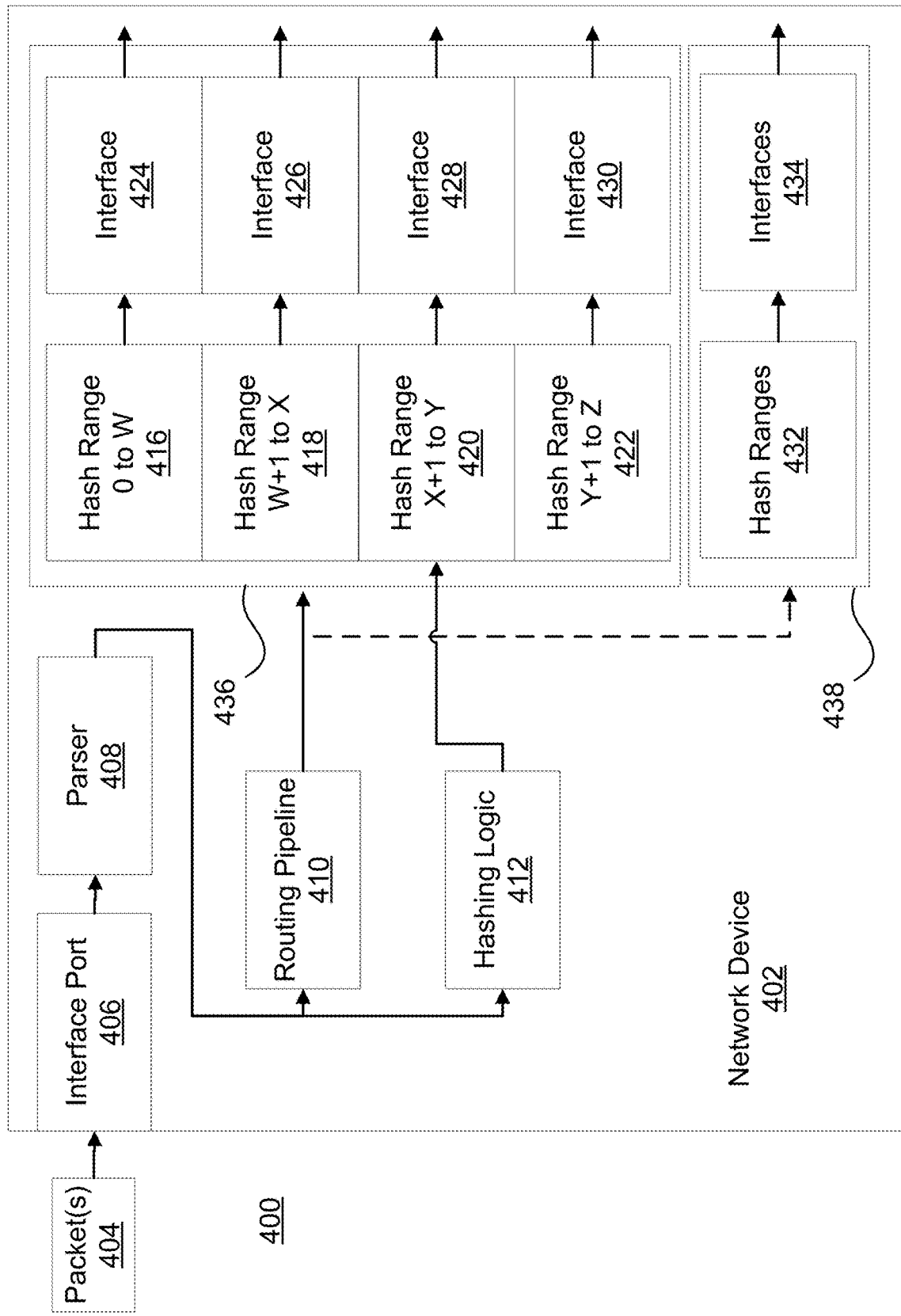
FIG. 4 illustrates a routing pipeline of a network device with multipath groups according to certain embodiments.

FIG. 4 illustrates a logical diagram of a network device 402 according to certain embodiments. Network device 402 can be similar to network device 302. Network device 402 can be a part of a network infrastructure 400. Network device 402 can receive network packet(s) 404 from other network devices (not shown) of network infrastructure 400. Network packet(s) 404 can be received at input interface port 406. Network packets 404 can then proceed to parser 408. Parser 408 can parse network packet(s) 404 to obtain information for routing of network packet(s) 404. For example, parser 408 can obtain destination, VLAN, MAC, source and/or destination IP address, or other information that can be parsed in order to determine, by network device 402, a destination address to route network packet(s) 404. Routing pipeline module 410 can proceed to process network packet(s) 404.

Routing Pipeline 410 can extract and use packet information from network packet(s) 404 to, for example, select a multipath group, next-hop, or other group for routing of network packet(s) 404. A specific group can be selected from a plurality of groups by information determined by routing pipeline 410. Routing pipeline 410 can include, for example, hash or other functionality to generate a group identifier and an egress path. Items 408-438 can provide functionality to route network packets to a specific egress interface of a multipath group.

Routing Pipeline 410 is illustrated as selecting multipath group 436 as a destination for packet(s) 404. Also illustrated is another multipath group 438 that could alternatively be selected by routine pipeline 410. Each of multipath groups 436 and 438 includes hash reference ranges 416-422 and 432 respectivelly. Each Hash reference range is associated with a respective corresponding interface 424-430 and 434. Hashing logic 412 can generate hash value(s) using information parsed from network packet(s) 404 by parser unit 408. These hash value(s) can enable a certain interface to be selected within a specific multipath group. For example, one of hash reference ranges 416, 418, 420, or 422 can be located that generated hash value(s) fall within. For example, a hash value of 0x400 may be generated by hashing logic 412. Hash reference range 418 may have hash reference ranges of between 0x400 and 0x499, for example. Similarly hash reference range 416 may include hash ranges of between 0x000 and 0x199, for example. In this example, the hash value of 0x400 would fall within hash range 418 and not hash range 416.

Each of hash reference ranges 416, 418, 420, and 422 can correspond to an interface. For example, hash reference range 418 can correspond to interface 426. Each of interfaces 424, 426, 428, and 430 can indicate an interface port to output network packets. As used herein, the term "hash reference range" for an interface referenced in a multipath group means a range of values associated with an interface such that, if a hash value generated for a network packet falls within the hash reference range for the interface, that interface is selected for that network packet. Each of the interface ports indicated by an interface can be associated with a virtual output queue (i.e., each virtual output queue can store packets, each having a different hash value), as disclosed herein. A virtual output queue can also be shared by multiple multipath groups.

Figure 5:
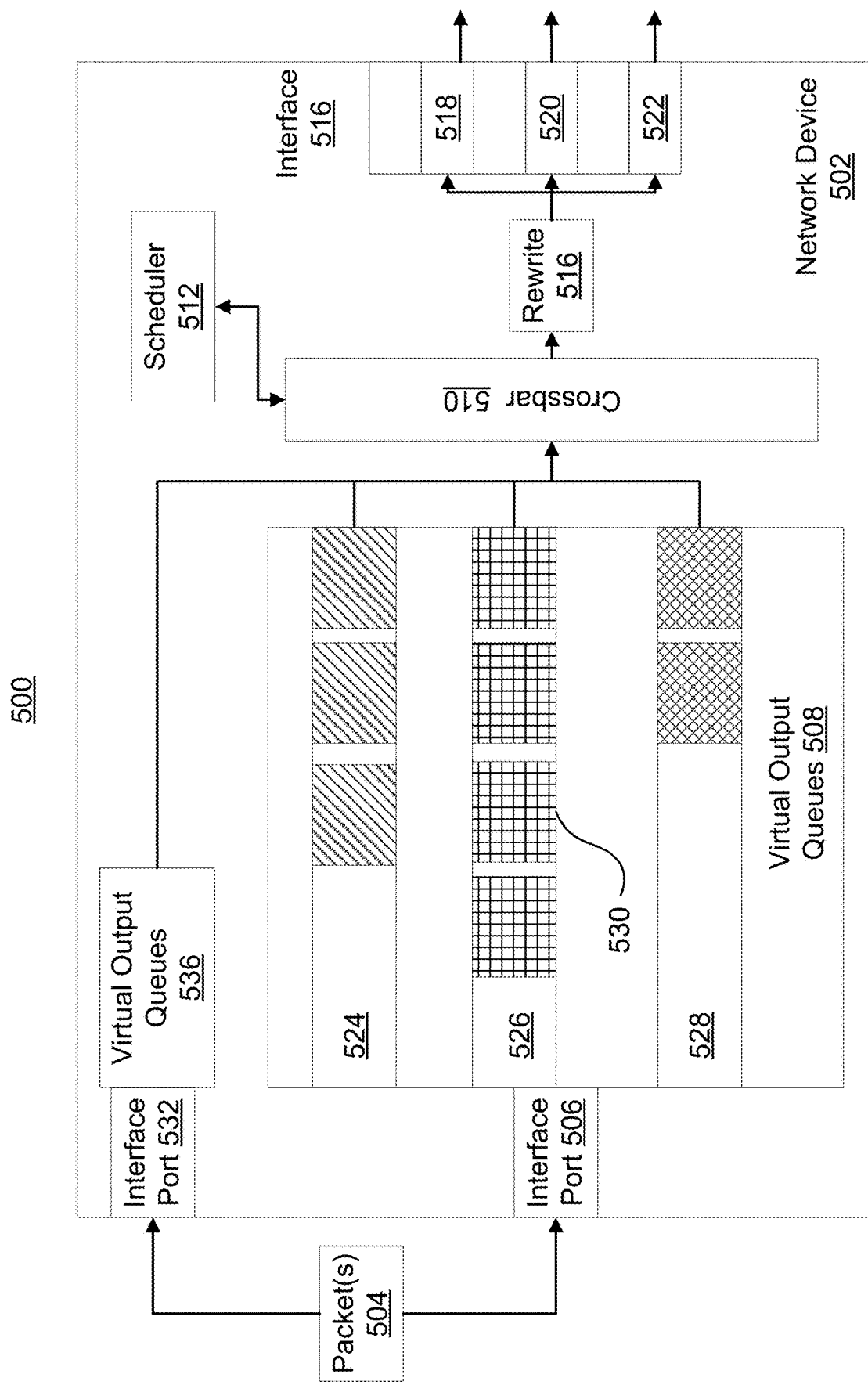
FIG. 5 illustrates a routing pipeline of a network device with virtual output queues according to certain embodiments.

FIG. 5 illustrates a network device 502 according to certain embodiments. Network device 502 can be similar to network device 402. Network device 502 can include input interface ports 506 and 532 for receiving network packet(s) 504, which can be similar to network packet(s) 504. Each input interface port 506 and 532 can be associated with a respective set of Virtual Output Queues 508 and 536. Virtual Output Queues 508 is illustrated as including multiple virtual output queues 526, 526, and 528. Each virtual output queue 524, 526, and 528 can be associated with a respective output interface 518, 520, or 522. Each of virtual output queues 524, 526, and 528 can function as a queue or buffer to temporarily store data 530 to be output by a corresponding output interface (e.g., ports 518, 520, or 522). Data 530 can be a network packet or a pointer to a network packet, for example. Each virtual output queue used herein can store network packets, pointers to network packets, indicators of network packets, or combinations thereof.

Input interface port 532 can be associated with virtual output queues 536. Virtual output queues 536 can be similar in function and organization as virtual output queues 508. For example, virtual output queues 536 can include multiple virtual queues similar to virtual output queues 526, 526, and 528. Each output queue of virtual output queues 536 can each be associated with a corresponding egress interfaces (such as one of interfaces 518, 520, or 522). Virtual output queues 536 can include a virtual output queue corresponding to egress interface 518 and virtual output queues 508 can also include virtual output queue 526 corresponding to egress interface 518. If egress interface 518 becomes congested, then virtual output queue 526 and a virtual output queue of virtual output queue 536 may begin to fill. For example, virtual output queue 526 is illustrated as being more full (at higher capacity) than virtual output queue 528. It should be noted that data 530 can be network packets from multiple input flows that have been routed to a same egress interface (as described regarding FIG. 2).

Crossbar 510 can be similar crossbar 322. Scheduler 512 can be similar to scheduler 320. Rewrite module 516 can be similar to rewrite module 324. Interfaces 516 can be similar to interfaces 326.

Figure 6:
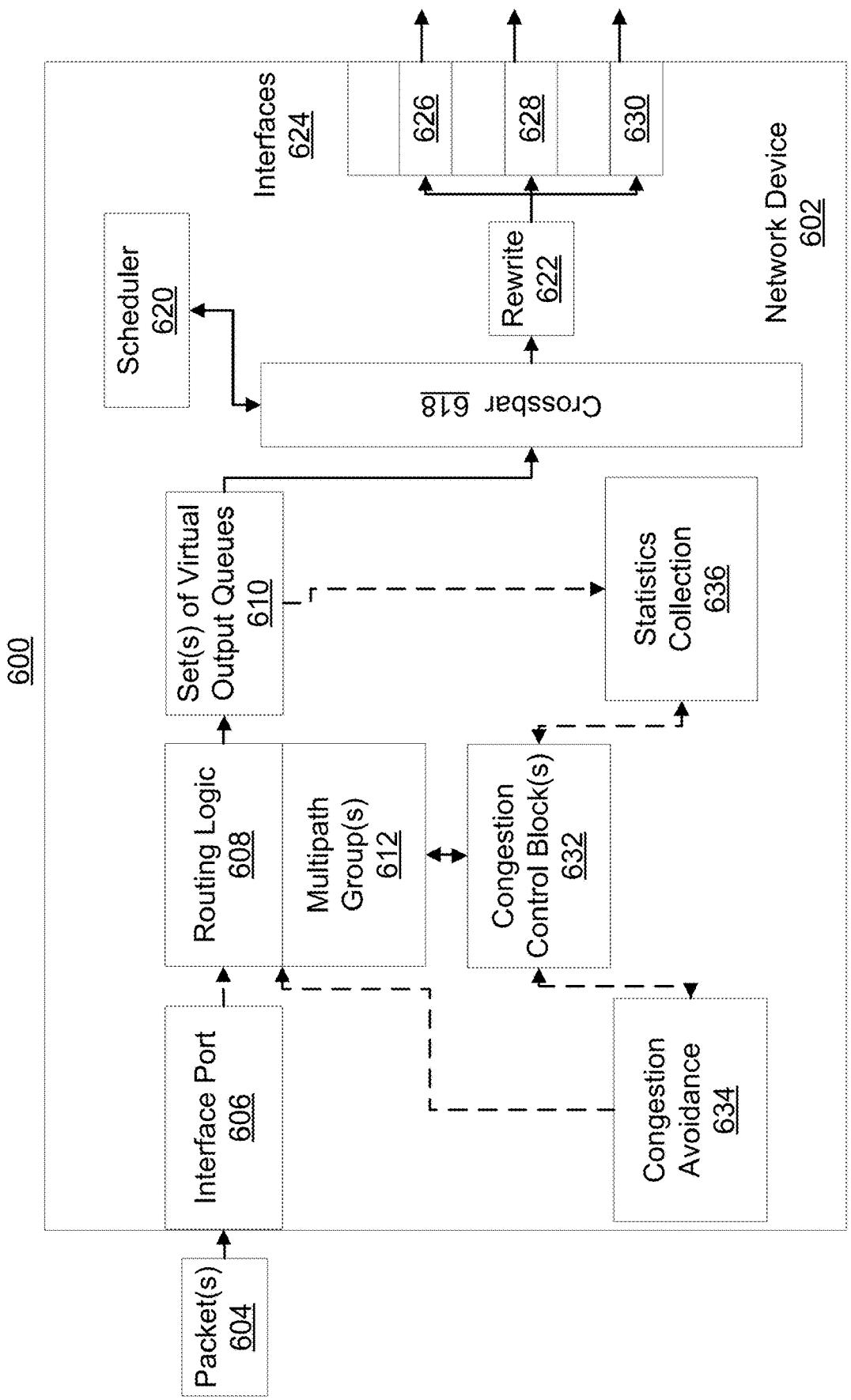
FIG. 6 illustrates a network device with congestion detection and avoidance features according to certain embodiments.

FIG. 6 illustrates a logical representation of network device 602 according to certain embodiments. Network device 602 can be similar to network device 502. Network device 602 can receive network packet(s) 604 from network infrastructure 600. Network packet(s) 604 can be received at interface port 606. Network packet(s) 604 can then be processed routing logic 608 to be directed to multipath group(s) 612. Multipath group(s) 612 can each include functionality of FIG. 4, for example, and can each include a plurality of interfaces (not shown). Each of the plurality of interfaces can correspond to an egress interface, such as interfaces 626, 628, or 630.

Each of set(s) of virtual output queues 610 can include a virtual output queue associated with an egress interfaces, such as interfaces 626, 628, or 630. Network packets to be output by one of interfaces 626, 628, or 630, selected by an interface of multipath group(s) 612, and can be stored by a corresponding virtual output queue of set(s) of virtual output queues 610. Furthermore, each multipath group of multipath group(s) 612 can be associated with a congestion control block 632. Congestion control block(s) 632 can include statistical information corresponding to flows of network packets, as disclosed herein. By grouping multipath groups in this manner, statistical information can be obtained to identify congestion a virtual output queue with less overhead that individually analyzing each interface/multipath group. Techniques are disclosed herein regarding identification of shared-interface multipath groups.

Statistics collection logic 636 can be configured to examine set(s) of virtual output queues 610 to determine if a virtual output queue is relatively full (e.g., a number of network packets without a virtual output queue has reached a threshold). If so, statistical information from packets from the virtual output queue can be used to update and/or populate a congestion control block of congestion control block(s) 632. Each congestion control block can be associated with a corresponding multipath group of multipath group(s) 612.

Congestion Avoidance logic 634 can be configured to examine congestion control block(s) 632. If a threshold value of a counter of congestion control block(s) 632 meets a threshold, then congestion avoidance can be triggered. Congestion avoidance logic 634 can modify hash reference range(s) assigned to interfaces indicated by multipath group(s) 612, for example. This modification can reroute flows for output by different interfaces. Thus, if two elephant flows are identified causing congestion on a single interface, they can be rerouted to two separate interfaces, for example. Congestion Avoidance Logic 634 can be configured to modify one or more route entries in a routing table. For example, a route can be dissociated from a multipath group of multipath groups(s) 612 and associated with a new multipath group of multipath group(s) 612. Thus, a flow of network packets that was originally routed to a first multipath group of multipath group(s) 612 can be routed to a second multipath group of multipath group(s) 612. The re-association of a route can divide flows of network packets to two separate multipath groups when they may have originally been routed to one multipath group. By modifying hash reference ranges of a congested (or other) interface shared between the two multipath groups, network packets can be routed to a different interface and away from an identified congested interface. Additional features of congestion avoidance logic 633, statistics collection logic 636, and other components of network device 602 are disclosed herein.

Statistics collection logic 636 and/or congestion avoidance logic 634 can be implemented via a processor executing instructions stored in non-transitory memory, hardware logic gates, or via a combination of the preceding. In certain embodiments statistics collection logic 636 and/or congestion avoidance logic 6364 can share network device 602 resources in any combination. For example, all or any combination of statistics collection logic 636 and/or congestion avoidance logic 646 can share a memory device, processor, hardware device, or other.

As disclosed herein, multiple routes in a routing table can point to a single multipath group. Network packets received by a network device having a same or similar source and/or destination address can be referred to as belonging to a flow of network packets. If a relatively large number of network packets are routed via a same egress interface, the egress interface can experience congestion. In such instances, the egress interface can become congested or saturated, leading to dropped network packets and/or inefficient utilization of network resources. Disclosed herein are techniques to identify whether an egress interface is congested from flow(s) of network packets from multiple routes associated with one multipath group. Furthermore, techniques are disclosed to reroute flows of network packets that are identified as contributing to congestion and associated with multiple routes to a multipath group. The techniques disclosed can efficiently utilize network resources by distributing flows of network packets across egress ports of a network device to alleviate congestion determined at certain egress interface(s).

Figure 7:
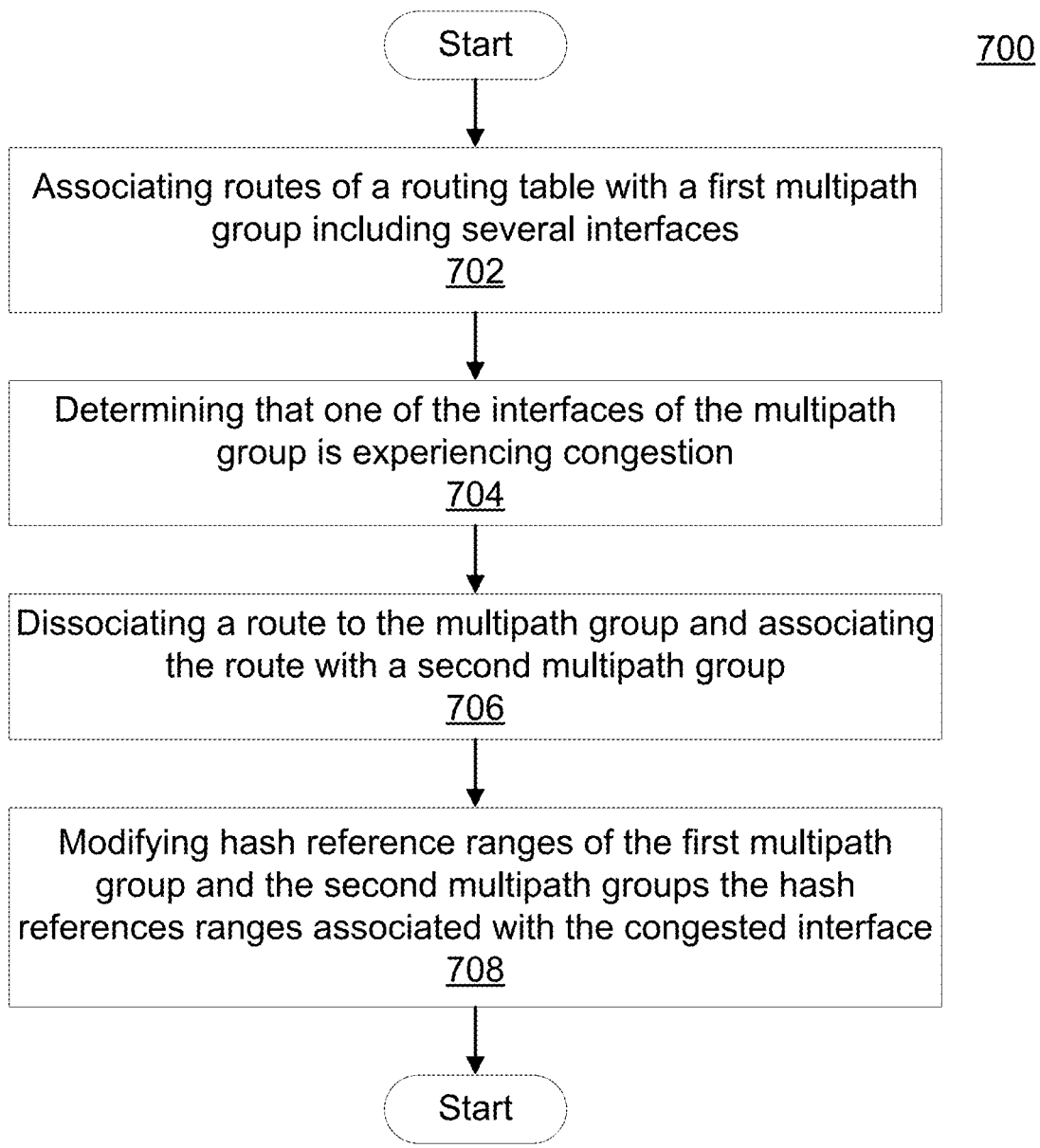
FIG. 7 illustrates a flowchart for implementing congestion avoidance according to certain embodiments.

FIG. 7 illustrate a flowchart 700 embodying an example method for avoiding congestion by dissociating a route from a multipath group and associated with same route to a new multipath group to reroute flows of network packets to different interfaces. These methods may be implemented by the devices described herein, such as, for example, network devices 206, 302, 402, 502, or 602. At 702, multiple routes of a routing table are associated with a first multipath group. The first multipath group can include several egress interfaces. The association of the routes can be accomplished by using hashing techniques, for example, as disclosed herein. The association can include a pointer or other reference stored in a routing table for a route. The pointer can be a reference to a multipath group, for example.

At 704, a determination can be made that one interface of the multipath group is experiencing congestion. As disclosed herein (via flowcharts 900 and 1200, for example), this determination can be made by examining network packets from a virtual output queue. Statistical information can be gathered from the network packets and recorded in a congestion control block, for example. The congestion control block can include one or more counters for recording statistical information for one or more flows of network packets. At 706, a route from among many pointing to the same multipath group can be dissociated from the multipath group and associated with a new multipath group. Dissociation can include removing or altering a pointer or other reference associated with the route within the routing table. For example, a pointer referencing a first multipath group can be overridden with a new pointer to a different multipath group. The new multipath group can contain the same interfaces of the original multipath group. However, at 708, hash reference ranges of the first or second multipath group can be modified such that a flow of network packets contributing to the congestion is diverted to a different interface.

Figure 8:
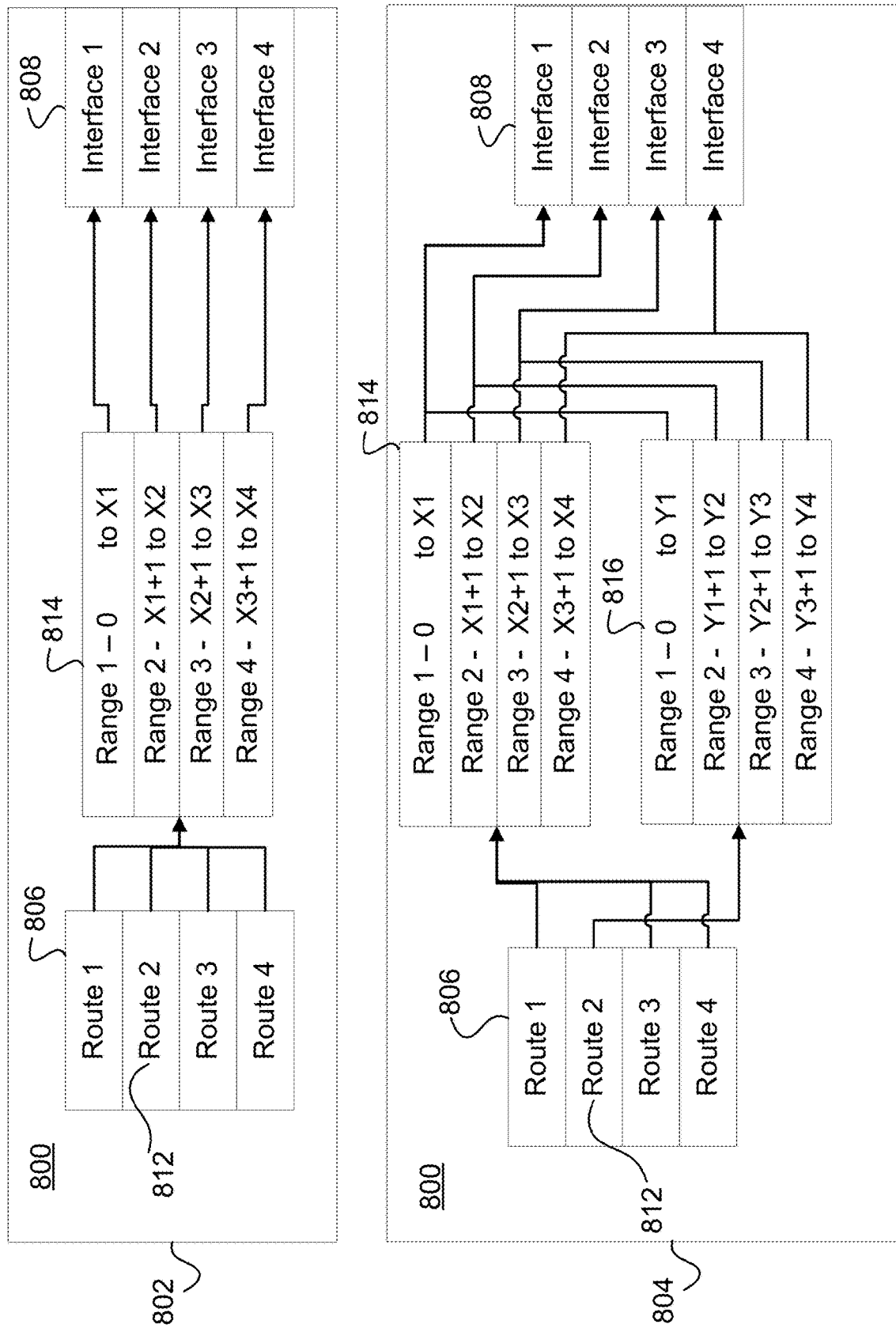
FIG. 8 illustrates a routing table according to certain embodiments.

FIG. 8 illustrates an example device 800 in a first state 802 and second state 804. Device 800 illustrates features from implementing of the method of flowchart 700. The device 800 can be similar to device 602 and can include features of the disclosure. Device 800 is illustrated in a state 802 wherein a route 812 of a routing table 806 corresponds to a multipath group 814 (such as via step 702). The correspondence can include, as disclosed herein, storing in a routing table a pointer or other reference to multipath group 814 associated with route 812. As illustrated, multipath group 814 can include several interfaces 808. Each interface can be associated with a hash reference range (illustrated in multipath group 814).

At state 804, route 812 has been dissociated (after congestion is determined via step 704, for example) from multipath group 814 and instead associated with multipath group 816 (via step 706, for example). As illustrated, multipath group 816 can include the same interfaces 808 as multipath group 814. However, each interface can be associated with a different hash reference range in new multipath group 816 as compared to multipath group 814. Multipath group 816 can be generated in response to determining congestion at an interface 808.

Figure 9:
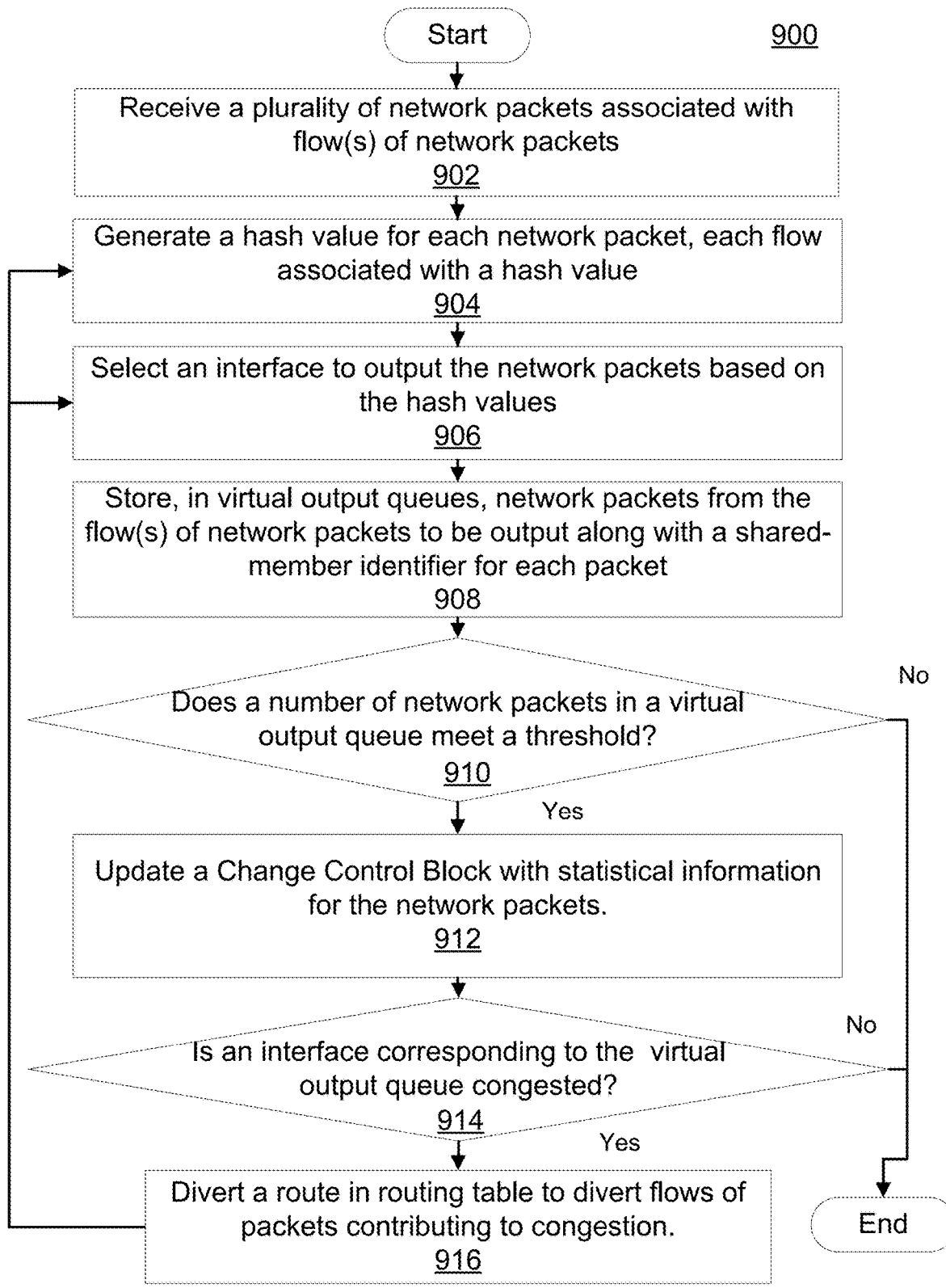
FIG. 9 illustrates a flowchart for implementing congestion avoidance according to certain embodiments.

FIG. 9 illustrates an example flowchart 900 for methods for implementing techniques at network devices according to certain embodiments. Flowchart 900 expands upon flowchart 700 and includes additional features of certain embodiments. These methods may be implemented by the devices described herein, such as for example network device 206, 302, 402, 502, or 602. At 902, a plurality of network packets can be received by a network device. Each of the network packets may be associated with a flow of network packets. The network packet may be associated with a flow based on the contents of the network packet. For example, in certain implementations, all network packets belonging to the same network flow may have the same source address, destination address, source port or destination port, etc. At 904, hash value(s) can be generated for each of the network packets (by hashing logic 412, for example). At 906, an interface port can be selected to output each packet. The generating of hash values and selection of ports can use techniques disclosed for operation of network device 402, for example.

At 908, data from the flows of data can be stored within a virtual output queue, as described herein for the operation of network device 502, for example. At 910, a determination can be made if a number of packets in a virtual output queue meets a threshold. At 912, if the number of network packets meet the threshold, then a congestion control block can be updated. The congestion control block can be located via a congestion control block identifier associated with each multipath group or network packet. Steps 910 and 912 can be performed by Statistics collection logic 636, for example.

At 914, one or more congestion control blocks can be examined to determine if an interface associated with a virtual output queue is experiencing congestion. This determination can be made by, for example, determining if a counter of a congestion control block meets a threshold as shown in more detail in FIG. 11. A hash value associated with the counter(s) can indicate a flow of network packets contributing to congestion. Using the congestion control block, the flow(s) of network packets contributing to congestion that are routed through one route of a routing table can be determined (e.g., via the use of Route ID 1118). Using this information, at 916, a route in a routing table can be diverted (i.e., dissociated and re-associated) from a first multipath group to a second multipath group to divert a flow of network packets contribution to congestion. The second multipath group can be a newly created multipath group and can include the same interfaces as the first multipath group. Furthermore, a hash value and/or hash reference ranges can be modified for the first and/or second multipath group to reroute flow(s) of network packet to alternative egress interface(s) of a network device.

Figure 10:
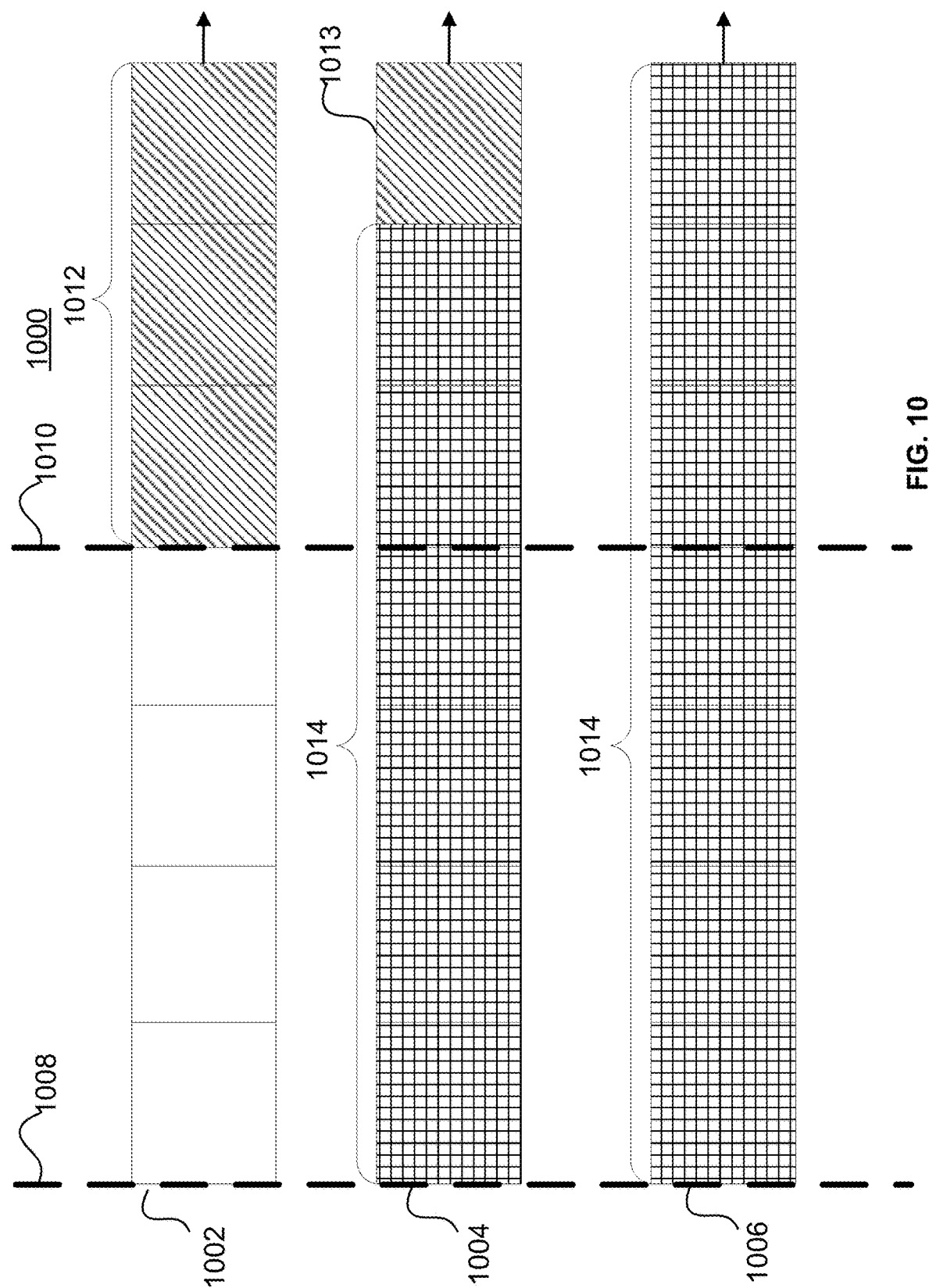
FIG. 10 illustrates states of a virtual output queue according to certain embodiments.

FIG. 10 illustrates a plurality of states 1000 of a virtual output queue that can be used to determine when a congestion control block is to be updated (such as via step 910). The states are indicates as 1002, 1004, and 1006. State 1002 indicates that data from three stored packets 1012 are stored within the queue. Stored packets 1012 are illustrated as being shaded. The remaining four locations are empty (do not store data from data packets) and are illustrated as not being shaded. Threshold 1010 is a threshold at which congestion can be detected. This threshold can be user assignable, determined by a network device, or preconfigured. When a number of network packets stored within a virtual output queue reaches threshold 1010, a network device can be triggered to accumulate data to populate a congestion control block, for example. In this example, each of stored packets 1012 can be analyzed to determine their hash value, source address, destination address, etc. which can be used to identify a flow of network packets to which each network packet is a part of. These flows can then be ranked to identify flows with the highest volume of data stored in a virtual output queue for a given time period. This information can then be used to update a congestion control block, for example.

At state 1004, congestion has proceeded to the point wherein the virtual output queue is full (indicated by reaching threshold 1008). At this point, any new block added to the queue may be dropped and not forwarded to an output port. At state 1004, a count of the number of packets from each flow may not be updated in order to avoid double counting of packet 1013, for example. Packets 1014 may therefore not be counted yet at state 1004. At state 1006, packets 1014 may now be counted as packet 1013 has been routed to an output port. A network device may include rules not to count packets within a queue until already counted packets have left the queue to, for example, avoid double counting of packets. In the alternative, if a new statistics gathering time window has been reached, all of the current packets within a virtual output queue may be counted. Alternatively, they may only be counted if they have exceeded threshold 1010. In still other embodiments, each new packet added to a virtual output queue may be counted.

FIG. 11 illustrates a Congestion control block 1100 (CCB) that can be used to capture statistical information (such as via step 912), set congestion avoidance parameter(s), and/or implement congestion avoidance according to certain embodiments. Congestion control block 1100 can be included in congestion control block(s) 632. Congestion control block 1100 includes a multipath group 1102. Multipath group 1102 can include a plurality of output interfaces, such as interfaces 808, for example. In certain embodiments, a congestion control block 1100 can be associated with each multipath group of a network device.

Congestion control block 1100 can include an enable bit 1104. Enable bit 1104 can be a flag that indicates, according to its value, whether congestion avoidance is active (e.g., congestions are being monitored and congestion avoidance techniques activated). Triggered bit 1106 can be used to indicate whether congestion has been detected and congestion avoidance techniques activated. Flow 1 Hit Count 1108 can be used to indicate a number of packets that have been counted during a certain time period from a specific flow of network packets. Flow 1 can be a flow from several flows associated with an output port wherein the flows have been ranked. For example, Flow 1 can be a top ranked flow, according to volume of data transmitted for a given time period. Flow 1 Hash Value 1110 can be a hash value generated for Flow 1. This hash value can be generated by hashing logic 511, for example. Similarly Flow 2 Hit Count 1112 can be a number of packets received from a second ranked flow of data packets routed to the same output queue as Flow 1. Flow 2 Hash Value 2 1114 can be a hash value associated with Flow 2.

Route ID 1118 can be an identifier to a route selected for a flow of network packets to which statistical information of the congestion control block pertains to. Once congestion is detected at a congestion control block, the Route ID 1118 can used to identify a route to dissociate from a multipath group contributing to congestion and associate the same route with a new multipath group. Interface ID 1116 can be an identifier of a certain interface of multipath group 1102 that is experiencing congestion. For example, interface ID 1116 can indicate that congestion is detected on output interface 626, 628, or 630 of FIG. 6. Timer 1120 can be a value (that can be user assignable) to indicate a time period in which statistics (such as flow counts) are collected before being reset. Timer 1120 can be used to limit an amount of data in which statistics for network packets within a queue are analyzed to determine high flow data flows and enable congestion avoidance on more problematic high bandwidth utilizing flows (e.g., high volume of packets in a relatively short period of time) as opposed to a trickle flow (e.g., high volume of packets over a relatively long period of time).

Timer 1120 can be used to analyze collected congestion statistics for a fixed amount of time. For example, Timer 1120 can be set to run down from 5 seconds to 0 seconds before automatically resetting back to 5 seconds, along with collected statics of a congestion control block. Congestion control block 1100 is a non-limiting example and may include additional or other fields. For example, congestion control block 1100 may include threshold values for flow packet counts, additional flow counters/hash values, or other information/variables.

Figure 12:
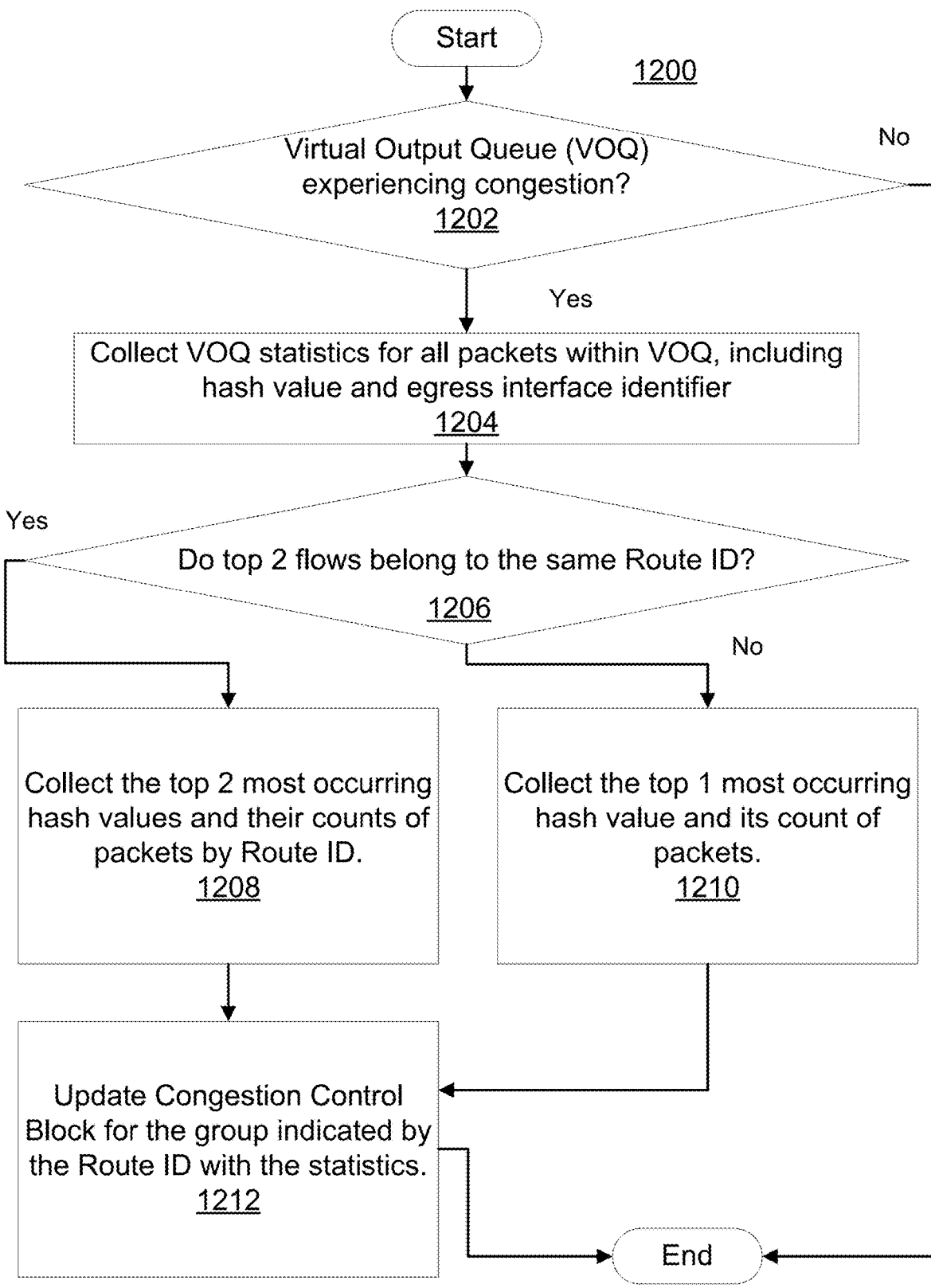
FIG. 12 illustrates a flowchart for updating a congestion control block according to certain embodiments.

FIGS. 12-15 further expand upon flowcharts 700 and 900 and includes additional features of certain embodiments. FIG. 12 illustrates an example flowchart 1200 for methods for implementing operation of network devices according to certain embodiments. The method of flowchart 1200 can be used by statistics collection logic 636 to, for example, update statistical information stored within a congestion control block (such as congestion control block 1100) associated with a multipath group. At 1202, a determination can be made as to whether a virtual output queue is experiencing congestion. This determination can be made by, for example, determining that a number of network packets with a queue has exceeded a threshold (such as threshold 1010). If not, then the method can end as no congestion may have been determined.

If congestion has been determined then, at 1204, statistics for the virtual output queue can be collected and/or ranked for all packets within the virtual output queue (assuming that packets in the virtual output queue have not already been counted, as described for FIG. 10). At 1206, a determination can be made if the top two flows of network packets contributing the most data packets to the virtual output queue for a given time period belong to the same route (using route ID 1118, for example). If so, then hash values and counts of number of packets associated with each of the top two flows of network packets can be collected. At 1210, if the top two flows do not belong to the same route, then the top flow hash value and count value can be collected. At 1208, if the top two flows do belong to the same route, then the top two flow hash values and count values can be collected. At 1212, a congestion control block associated with the multipath group to which the top one or two flows belong can be updated with statistical information corresponding to attributes illustrated in the congestion control block of FIG. 11.

Figure 13:
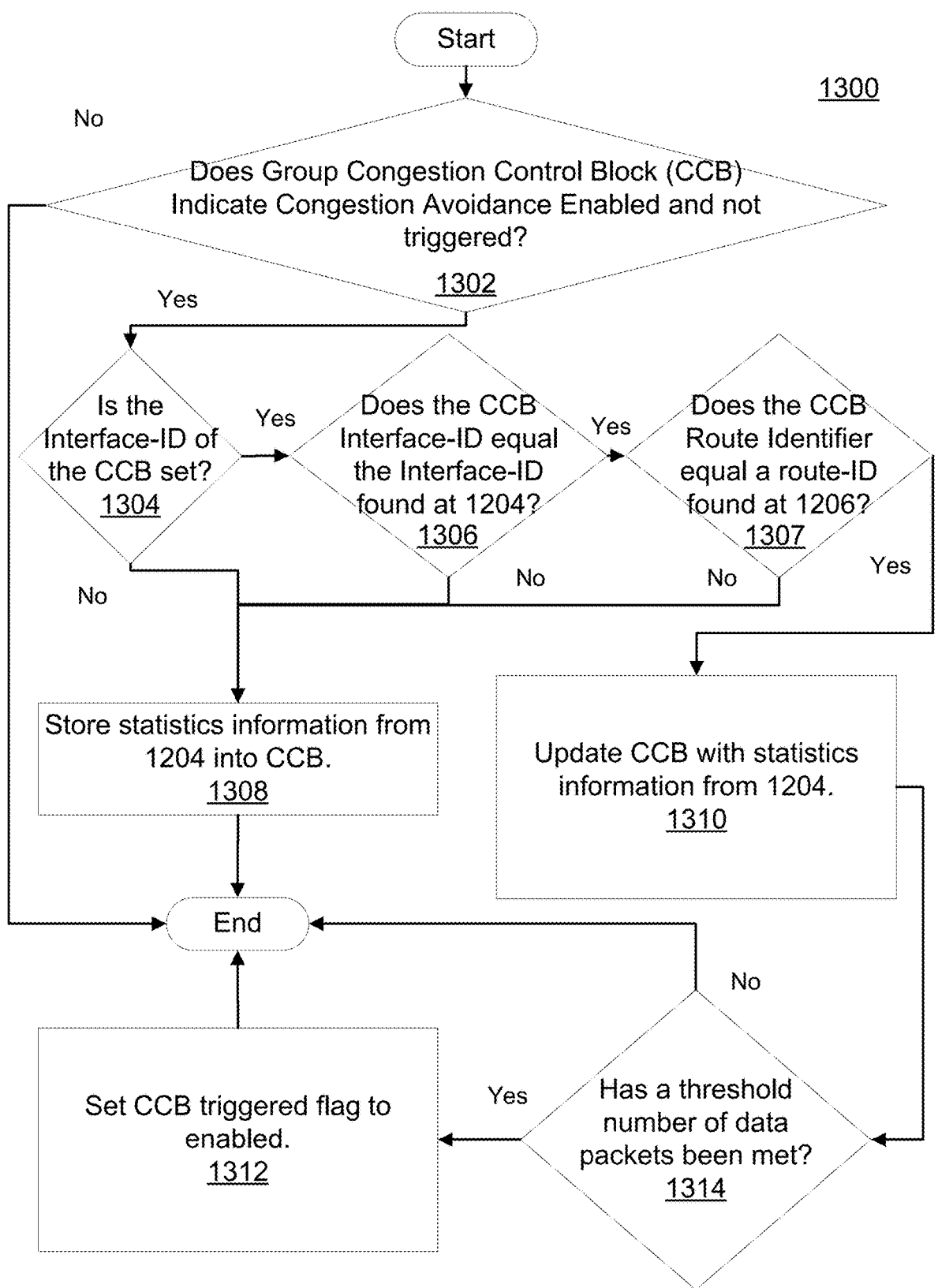
FIG. 13 illustrates a flowchart for determining congestion according to certain embodiments.

FIG. 13 illustrates an example flowchart 1300 for methods for implementing operation of network devices according to certain embodiments. The method of flowchart 1300 can be used by statistics collection logic 636 to, for example, identify elephant flow(s) that may be congesting a network device. At 1302, a determination can be made as to whether information from a congestion control block indicates that congestion avoidance is enabled and not triggered. If congestion is already triggered or the congestion avoidance is not enabled for a multipath group, the method can end. If however, these conditions are true, flowchart 1300 can proceed to 1304 wherein a determination can be made if an interface identifier of the congestion control block is set. If it is not set, then congestion information may not have been stored by the congestion control block. If the interface identifier is not set, then, at 1308, statistics information can be copied directly into the congestion control block, the information representing a current state of network packets stored within a virtual output queue. The information copied can include a Flow 1 Hit count, a Flow 1 Hash value, a Flow 2 Hit Count, a Flow 2 Hash value, an interface identifier (ID), or other information. These attributes can be similar to those explained regarding Congestion control block 1100.

If the interface identifier in the congestion control block is set at 1304, then, at 1306, a determination can be made if an interface identifier determined from network packets in a virtual output queue (as explained for steps 906 and/or 1204, for example) matches an interface identifier already stored in a congestion control block. If not, then the gathered statistical information can be stored in the congestion control block at 1308, overwriting existing congestion control block information. If the interface identifier matches the interface identifier stored within the change control block, then, at 1307, a determination can be made if the route identifier determined from network packets in a virtual output queue (as explained for step 1206, for example) matches a route identifier already stored in the congestion control block. If no, the method can proceed to 1308. If the interface identifier matches the interface identifier stored within the change control block and the route identifier matches the route identifier stored within the change control block, then, at 1310, the change control block can be updated with statistical information from 1204.

Updating the change control block with statistics information at 1310 can include comparing hash values current stored as Flow 1 Hash Value or Flow 2 Hash value to hash values determined at 1208 or 1210. If either of the hash values determines at 1208 or 1210 equals a hash value stored in the congestion control block, then the count of hash value of 1208 or 1210 can be added (aggregating the counts of network packets associated with the hash values) to the corresponding count of a hash value of the congestion control block. Otherwise, hash values of the congestion control block and corresponding count values can be overridden with statistics information obtain at 1208 or 1210.

At 1314, a determination can be made if a threshold number of data packets have been met by a hash count of the change control block. If the threshold has been met by a hash count of the congestion control block, then, at 1312, a triggered flag can be enabled within the congestion control block to indicate that congestion avoidance should be triggered. Otherwise, the flowchart 1300 can end. The method of flowchart 1300 can be operated in parallel with the method of flowchart 1200. The method of flowchart 1200 can operate to obtain statistical information of a virtual output queue of a network device. The method of flowchart 1300 can operate to update a congestion control block with statistical information obtain via the method of flowchart 1200. Furthermore, the method of flowchart 1300 can be used to identify one or more elephant flows that may be being routed by a network device.

Figure 14:
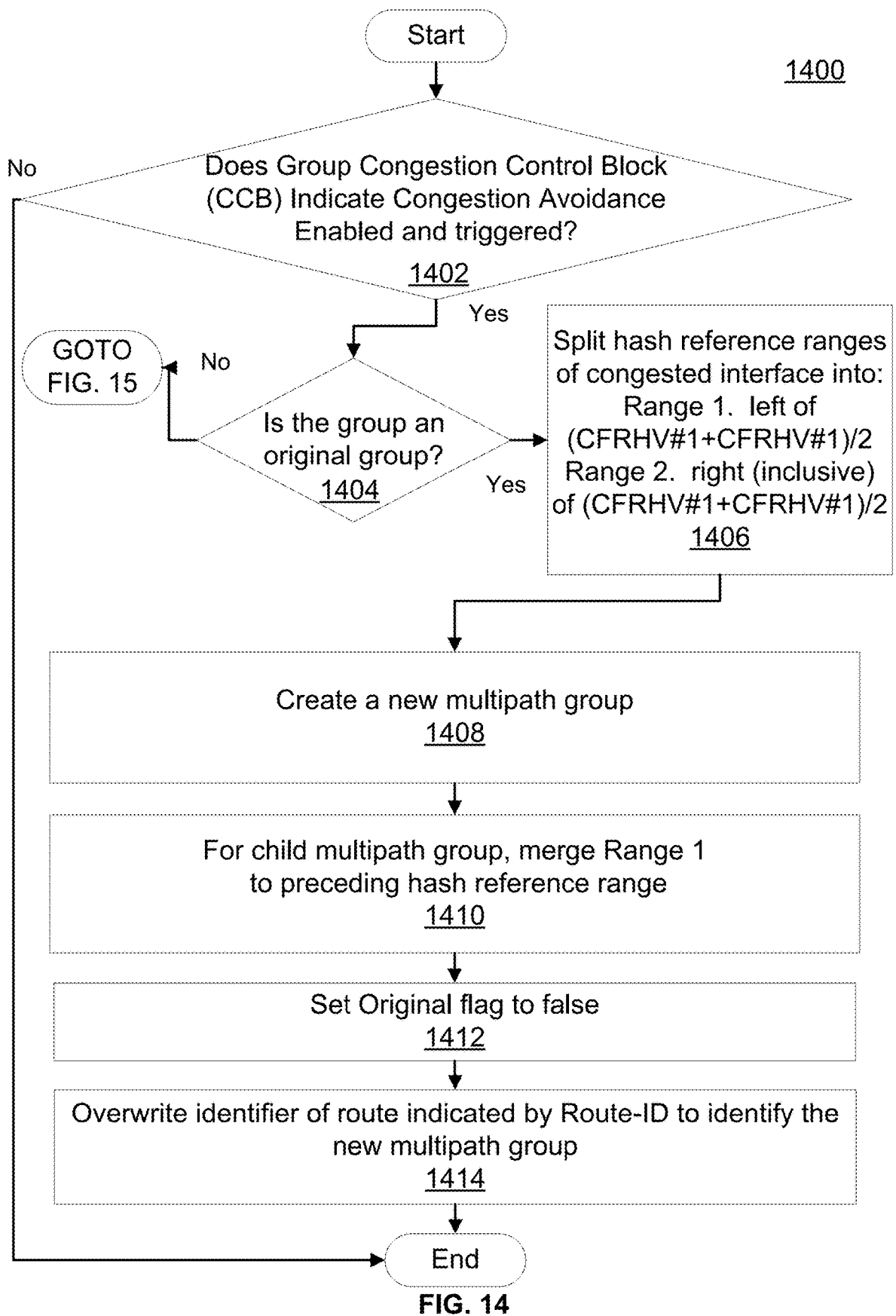
FIGS. 14-15 illustrate flowcharts for implementing congestion avoidance according to certain embodiments.

FIG. 14 illustrates an example flowchart 1400 for methods for implementing operation of network devices according to certain embodiments. The method of flowchart 1400 can be used in conjunction with methods of flowchart 1500 of FIG. 15 by congestion avoidance logic to, for example, route elephant flow(s) to different output interfaces of a device. At 1402, a determination can be made if a congestion control block indicates that congestion avoidance is enabled and triggered for a multipath group. If not, the method can end. If so, then, at 1404, a determination can be made if the group is an original group. This information can be determined based on a flag for the group being set to TRUE, for example. If the group is not an original, then the method can proceed to FIG. 15. If the group is an original, then, at 1406, a hash reference range of a congested interface can be split into two portions. More specifically, the hash values of two flows of network packets that are stored within a congestion control block can be summed and divided by two. Range 1 is illustrated as including left (e.g., the lower numbers of a hash reference range) to the halfway point between the two hash values from the congestion control block. Conversely, Range 2 can include the right (higher numbers). The right range can be inclusive of the halfway point. In this manner, two flows of network packets contributing to congestion can be separated to be output on two different interfaces.

At 1408, a new multipath group can be created. The new multipath group can include the interfaces of the original group. This new group can include copies of various attributes of the original multipath group, including the hash reference ranges. At 1414, Range 1 from step 1406 can be merged with the left (preceding) hash reference range of an interface of the new multipath group. Additionally, a flag associated with the parent multipath group indicating if the parent is an original group can be set to true. A flag indicating if interfaces of the group have been split can be set to true. At 1412, a flag associated with the child multipath group can be sent to false, indicating that the group is a child group and not a parent group. Furthermore, flags can be set to associate the parent multipath group with the child multipath group. For example, an attribute associated with the parent multipath group can indicate or point to the child group. At 1414, a route identified by the route identifier 1118 of a congestion control block can be dissociated from the parent group and associated with the child group. This can be accomplished by, for example, overriding a pointer or other identifier in a routing table associated with the route to identify the child group instead of the parent group. Remaining route(s) that originally pointed to the parent multipath group can remain unaffected.

Figure 15:
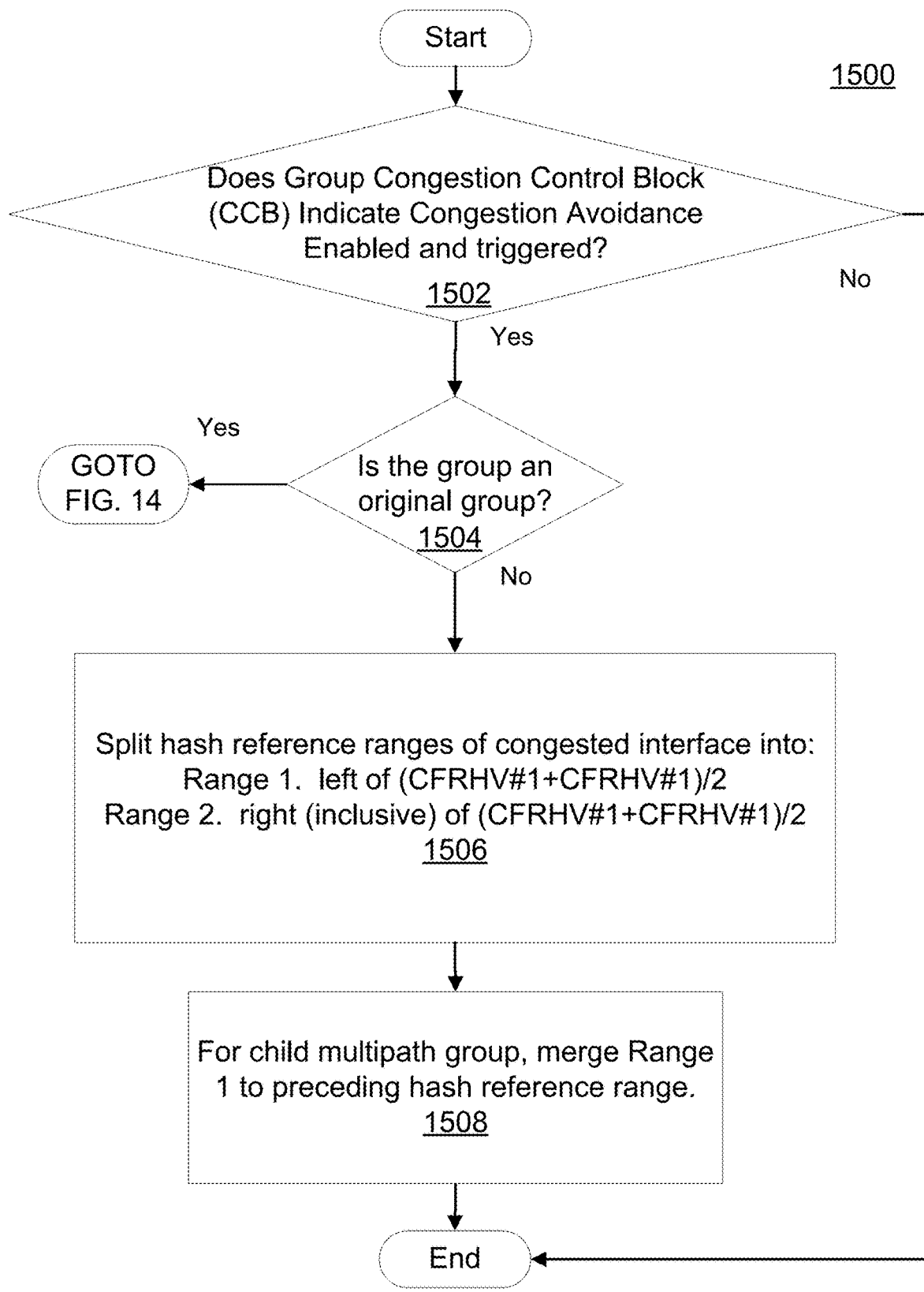

FIG. 15 illustrates an example flowchart 1500 for methods for implementing operation of network devices according to certain embodiments. The method of flowchart 1500 can be used by congestion avoidance logic to, for example, route elephant flow(s) to different output interfaces of a device. Flowcharts 1400 and 1500 can be used together by congestion avoidance logic. At 1502, a determination can be made if a congestion control block indicates that congestion avoidance is enabled and triggered for a multipath group. If not, the method can end. If so, then at 1504, a determination can be made if the group is an original group (by examining a flag associated with the group, for example). If the group is an original group, the method can proceed to FIG. 14. If the group is not an original group, the method can proceed to 1506. At 1506, a hash reference range of a congested interface can be split into two portions. More specifically, the hash values of two flows of network packets that are stored within a congestion control block can be summed and divided by two. Range 1 is illustrated as including left (e.g., the lower numbers of a hash reference range) to the halfway point between the two hash values from the congestion control block. Conversely, Range 2 can include the right (higher numbers). The right range can be inclusive of the halfway point. In this manner, two flows of network packets contributing to congestion can be separated to be output on two different interfaces. At 1508, for a child multipath group of the multipath group Range 1 from 1506 can be merged with the left (preceding) interface hash reference range. If an exception occurs wherein a leftmost range is selected to be split, then the method can alternatively merge to with a right interface hash reference range.

In certain embodiments, a controller can maintain the following variables to aid in tracking of multipath groups and/or routes:

For each multipath group:

Group_ID—An identifier which can uniquely identify this group in the system.

Child—If not NULL, then can contain a reference to a child group created by split of a parent group.

Parent—If not NULL, then can contain a reference to parent of this group, from which this child group was created.

Original—A boolean flag. If TRUE, then can indicate that this group was NOT created by the disclosed techniques.

RouteReferenceCount—A count of a number of routes pointing to this multipath group.

ChildCreationTime—If child is valid, then this field can record the time when it was created. For each route:

MultipathGroup A reference to a multipath group this route is pointing to.

In certain embodiments, if a multipath group has Group-.child !=NULL, it can imply that a child group has been created and a corresponding extension route for the child group. If a new member is added to an original multipath group by a management subsystem or by routing protocols, then the multipath group referenced by Group.child can be deleted. Similarly, the extension route referenced by Group.route.child (the child route of the route which is pointing to this group) can also be deleted. This can simplify the implementation of disclosed techniques and enable the techniques to more effectively handle congestion control in a newly formed group after addition or removal of a member.

In certain embodiments, the controller can periodically review each of the multipath groups and examines the Group.ChildCreationTime and/or Route.ChildCreationTime for that group. The controller can be configured to automatically cleanup the mutipath groups after they have reached certain age (e.g., a time between a current time and a ChildCreationTime has reached a threshold and has become stale) and also cleanup their associated route extensions created along with the group. Clean up functionality can be configured to trigger when a number of extension routes have been created by this techniques and/or have reached a specific number threshold. Clean up functionality can also be triggered based on an age of a created group, a route, or a combination of both.

Computing Systems

Figure 16:
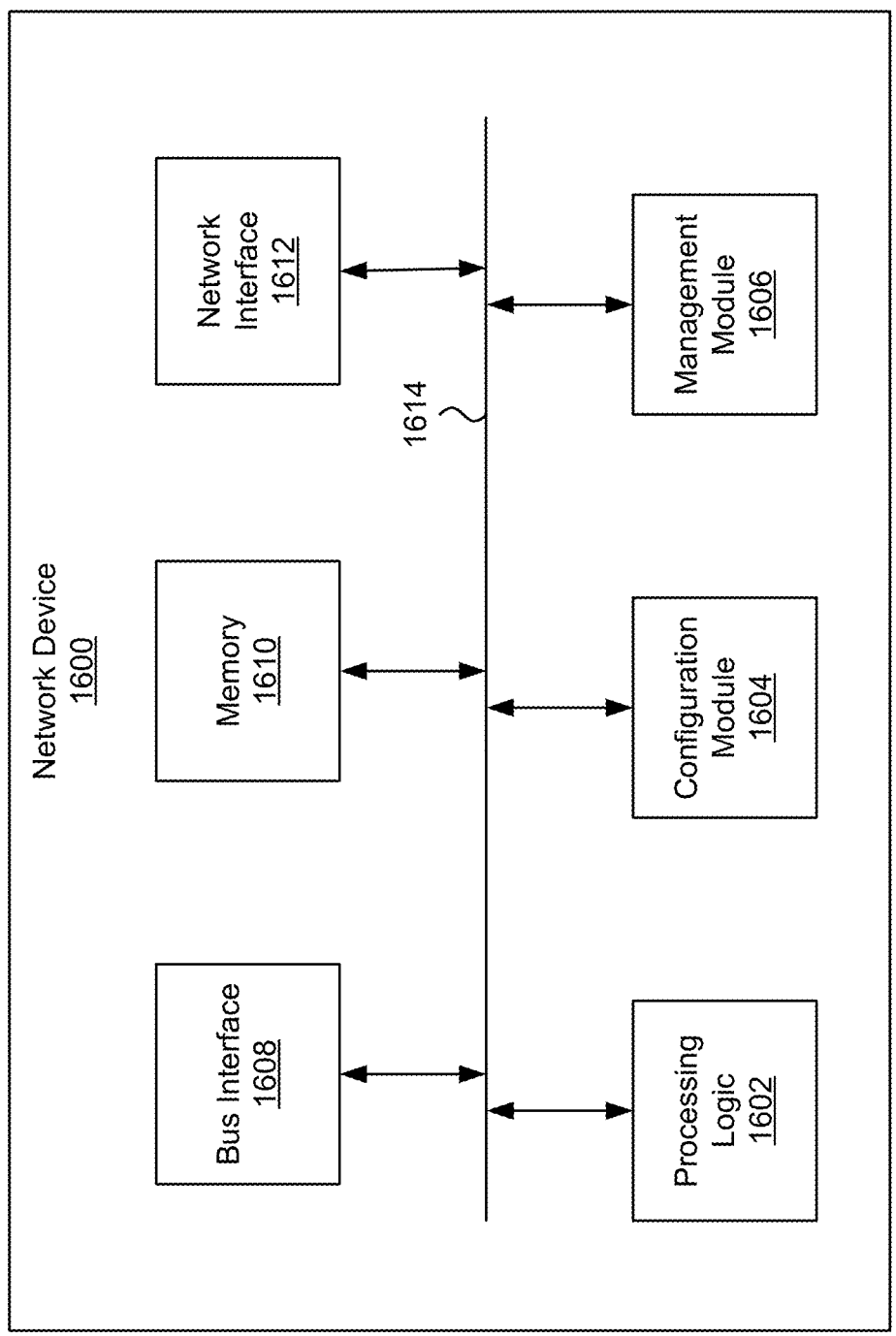
FIG. 16 illustrates an example of a network device, according to certain aspects of the disclosure.

FIG. 16 illustrates an example of a network device 1600. Functionality and/or several components of the network device 1600 may be used without limitation with other embodiments disclosed elsewhere in this disclosure, without limitations. A network device 1600 may facilitate processing of packets and/or forwarding of packets from the network device 1600 to another device. As referred to herein, a "packet" or "network packet" may refer to a variable or fixed unit of data. In some instances, a packet may include a packet header and a packet payload. The packet header may include information associated with the packet, such as the source, destination, quality of service parameters, length, protocol, routing labels, error correction information, etc. In certain implementations, one packet header may indicate information associated with a series of packets, such as a burst transaction. In some implementations, the network device 1600 may be the recipient and/or generator of packets. In some implementations, the network device 1600 may modify the contents of the packet before forwarding the packet to another device. The network device 1600 may be a peripheral device coupled to another computer device, a switch, a router or any other suitable device enabled for receiving and forwarding packets.

In one example, the network device 1600 may include processing logic 1602, a configuration module 1604, a management module 1606, a bus interface module 1608, memory 1610, and a network interface module 1612. These modules may be hardware modules, software modules, or a combination of hardware and software. In certain instances, modules may be interchangeably used with components or engines, without deviating from the scope of the disclosure. The network device 1600 may include additional modules, not illustrated here, such as components discussed with respect to the nodes disclosed in FIG. 17. In some implementations, the network device 1600 may include fewer modules. In some implementations, one or more of the modules may be combined into one module. One or more of the modules may be in communication with each other over a communication channel 1614. The communication channel 1614 may include one or more busses, meshes, matrices, fabrics, a combination of these communication channels, or some other suitable communication channel.

The processing logic 1602 may include application specific integrated circuits (ASICs), digital signal processors (DSPs), programmable logic device (PLD), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 1602 may include processors developed by ARM®, MIPS®, AMD®, Intel®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 1602 may be stored on a computer-readable storage medium, for example, in the form of a computer program. The computer-readable storage medium may be non-transitory. In some cases, the computer-readable medium may be part of the memory 1610.

The memory 1610 may include either volatile or non-volatile, or both volatile and non-volatile types of memory. The memory 1610 may, for example, include random access memory (RAM), read only memory (ROM), Electrically Erasable Programmable Read-Only Memory (EEPROM), flash memory, and/or some other suitable storage media. In some cases, some or all of the memory 1610 may be internal to the network device 1600, while in other cases some or all of the memory may be external to the network device 1600. The memory 1610 may store an operating system comprising executable instructions that, when executed by the processing logic 1602, provides the execution environment for executing instructions providing networking functionality for the network device 1600. The memory may also store and maintain several data structures and routing tables for facilitating the functionality of the network device 1600.

In some implementations, the configuration module 1604 may include one or more configuration registers. Configuration registers may control the operations of the network device 1600. In some implementations, one or more bits in the configuration register can represent certain capabilities of the network device 1600. Configuration registers may be programmed by instructions executing in the processing logic 1602, and/or by an external entity, such as a host device, an operating system executing on a host device, and/or a remote device. The configuration module 1604 may further include hardware and/or software that control the operations of the network device 1600.

In some implementations, the management module 1606 may be configured to manage different components of the network device 1600. In some cases, the management module 1606 may configure one or more bits in one or more configuration registers at power up, to enable or disable certain capabilities of the network device 1600. In certain implementations, the management module 1606 may use processing resources from the processing logic 1602. In other implementations, the management module 1606 may have processing logic similar to the processing logic 1602, but segmented away or implemented on a different power plane than the processing logic 1602.

The bus interface module 1608 may enable communication with external entities, such as a host device and/or other components in a computing system, over an external communication medium. The bus interface module 1608 may include a physical interface for connecting to a cable, socket, port, or other connection to the external communication medium. The bus interface module 1608 may further include hardware and/or software to manage incoming and outgoing transactions. The bus interface module 1608 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 1608 may include the physical layer for any of these bus protocols, including a connector, power management, and error handling, among other things. In some implementations, the network device 1600 may include multiple bus interface modules for communicating with multiple external entities. These multiple bus interface modules may implement the same local bus protocol, different local bus protocols, or a combination of the same and different bus protocols.

The network interface module 1612 may include hardware and/or software for communicating with a network. This network interface module 1612 may, for example, include physical connectors or physical ports for wired connection to a network, and/or antennas for wireless communication to a network. The network interface module 1612 may further include hardware and/or software configured to implement a network protocol stack. The network interface module 1612 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the network device 1600 may include multiple network interface modules, each configured to communicate with a different network. For example, in these implementations, the network device 1600 may include a network interface module for communicating with a wired Ethernet network, a wireless 802.11 network, a cellular network, an Infiniband network, etc.

The various components and modules of the network device 1600, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems as disclosed with respect to FIG. 17.

Figure 17:
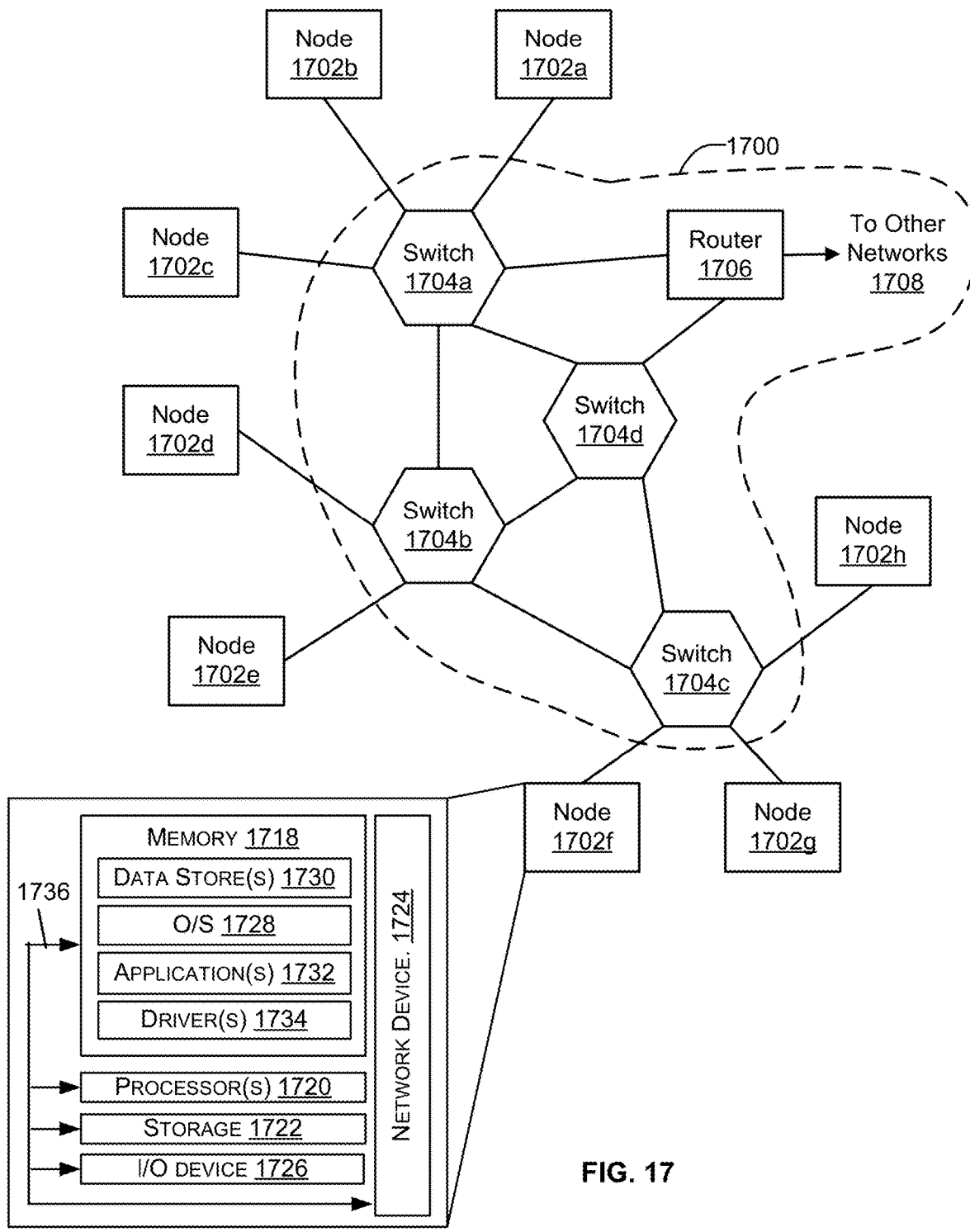
FIG. 17 illustrates an example architecture for features and systems described herein that includes one or more service provider computers and/or a user device connected via one or more networks, according to certain aspects of the disclosure.

FIG. 17 illustrates a network 1700, illustrating various different types of network devices 1600 of FIG. 16, such as nodes comprising the network device, switches and routers. In certain embodiments, the network 1700 may be based on a switched architecture with point-to-point links. As illustrated in FIG. 17, the network 1700 includes a plurality of switches 1704a-1704d, which may be arranged in a network. In some cases, the switches are arranged in a multi-layered network, such as a Clos network. A network device 1600 that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. Switches 1704a-1704d may be connected to a plurality of nodes 1702a-1702h and provide multiple paths between any two nodes.

The network 1700 may also include one or more network devices 1600 for connection with other networks 1708, such as other subnets, LANs, wide area networks (WANs), or the Internet, and may be referred to as routers 1706. Routers use headers and forwarding tables to determine the best path for forwarding the packets, and use protocols such as internet control message protocol (ICMP) to communicate with each other and configure the best route between any two devices.

In some examples, network(s) 1700 may include any one or a combination of many different types of networks, such as cable networks, the Internet, wireless networks, cellular networks and other private and/or public networks. Interconnected switches 1704a-1704d and router 1706, if present, may be referred to as a switch fabric, a fabric, a network fabric, or simply a network. In the context of a computer network, terms "fabric" and "network" may be used interchangeably herein.

Nodes 1702a-1702h may be any combination of host systems, processor nodes, storage subsystems, and I/O chassis that represent user devices, service provider computers or third party computers.

User devices may include computing devices to access an application 1732 (e.g., a web browser or mobile device application). In some aspects, the application 1732 may be hosted, managed, and/or provided by a computing resources service or service provider. The application 1732 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 1708. Additionally, the user device(s) may be part of the distributed system managed by, controlled by, or otherwise part of the service provider computer(s) (e.g., a console device integrated with the service provider computers).

The node(s) of FIG. 17 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some embodiments, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 1732 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 1702*a*-1702*h* may include at least one memory 1718 and one or more processing units (or processor(s) 1720). The processor(s) 1720 may be implemented in hardware, computer-executable instructions, firmware, or combinations thereof. Computer-executable instruction or firmware implementations of the processor(s) 1720 may include computer-executable or machine-executable instructions written in any suitable programming language to perform the various functions described.

In some instances, the hardware processor(s) 1720 may be a single core processor or a multi-core processor. A multi-core processor may include multiple processing units within the same processor. In some embodiments, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 1718 may store program instructions that are loadable and executable on the processor(s) 1720, as well as data generated during the execution of these programs.

Depending on the configuration and type of the node(s) 1702*a*-1702*h*, the memory 1718 may be volatile (such as RAM) and/or non-volatile (such as ROM, flash memory, etc.). The memory 1718 may include an operating system 1728, one or more data stores 1730, one or more application programs 1732, one or more drivers 1734, and/or services for implementing the features disclosed herein.

The operating system 1728 may support nodes 1702*a*-1702*h* basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, iOS, Android, and the like. The operating system 1728 may also be a proprietary operating system.

The data stores 1730 may include permanent or transitory data used and/or operated on by the operating system 1728, application programs 1732, or drivers 1734. Examples of such data include web pages, video data, audio data, images, user data, and so on. The information in the data stores 1730 may, in some implementations, be provided over the network(s) 1708 to user devices 1704. In some cases, the data stores 1730 may additionally or alternatively include stored application programs and/or drivers. Alternatively or additionally, the data stores 1730 may store standard and/or proprietary software libraries, and/or standard and/or proprietary application user interface (API) libraries. Information stored in the data stores 1730 may be machine-readable object code, source code, interpreted code, or intermediate code.

The drivers 1734 include programs that may provide communication between components in a node. For example, some drivers 1734 may provide communication between the operating system 1728 and additional storage 1722, network device 1724, and/or I/O device 1726. Alternatively or additionally, some drivers 1734 may provide communication between application programs 1732 and the operating system 1728, and/or application programs 1732 and peripheral devices accessible to the service provider computer. In many cases, the drivers 1734 may include drivers that provide well-understood functionality (e.g., printer drivers, display drivers, hard disk drivers, Solid State Device drivers). In other cases, the drivers 1734 may provide proprietary or specialized functionality.

The service provider computer(s) or servers may also include additional storage 1722, which may include removable storage and/or non-removable storage. The additional storage 1722 may include magnetic storage, optical disks, solid state disks, flash memory, and/or tape storage. The additional storage 1722 may be housed in the same chassis as the node(s) 1702*a*-1702*h* or may be in an external enclosure. The memory 1718 and/or additional storage 1722 and their associated computer-readable media may provide non-volatile storage of computer-readable instructions, data structures, program modules, and other data for the computing devices. In some implementations, the memory 1718 may include multiple different types of memory, such as SRAM, DRAM, or ROM.

The memory 1718 and the additional storage 1722, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 1718 and the additional storage 1722 are examples of computer storage media. Additional types of computer storage media that may be present in the node(s) 1702a-1702h may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 1702a-1702h. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 1702a-1702h may also include I/O device(s) 1726, such as a keyboard, a mouse, a pen, a voice input device, a touch input device, a display, speakers, a printer, and the like. The node(s) 1702a-1702h may also include one or more communication channels 1736. A communication channel 1736 may provide a medium over which the various components of the node(s) 1702a-1702h can communicate. The communication channel or channels 1736 may take the form of a bus, a ring, a switching fabric, or a network.

The node(s) 1702a-1702h may also contain network device(s) 1724 that allow the node(s) 1702a-1702h to communicate with a stored database, another computing device or server, user terminals and/or other devices on the network(s) 1700. The network device(s) 1724 of FIG. 17 may include similar components discussed with reference to the network device 1600 of FIG. 16.

In some implementations, the network device 1724 is a peripheral device, such as a PCI-based device. In these implementations, the network device 1724 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the bus interface module 1608 may implement NVMe, and the network device 1724 may be connected to a computing system using a PCIe interface.

A PCI-based device may include one or more functions. A "function" describes operations that may be provided by the network device 1724. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, the network device 1724 may include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 16, FIG. 17, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including,"

and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A device, comprising:
   a plurality of interfaces, each configured to output network packets;
   a memory configured to store a first multipath group associated with the plurality of interfaces, the first multipath group also being associated with a first way of distributing the network packets among the plurality of interfaces; and
   processing logic configured to, upon determining that a first interface of the first multipath group is congested:
      create a second multipath group, the second multipath group being associated with a second way of distributing the network packets among the plurality of interfaces, the second way being different from the first way;
      store the second multipath group in addition to the first multipath group in the memory; and
      distribute the network packets among the plurality of interfaces based on the first way and the second way associated with, respectively, the first multipath group or the second multipath group.

2. The device of claim 1, wherein the memory stores a routing table comprising a first route and a second route, and first information indicating that the first route and the second route are associated with the first multipath group;
   wherein the processing logic is configured to, upon determining that an interface of the first multipath group is congested:
      dissociate the first route from the first multipath group;
      associate the first route with the second multipath group; and
      store second information in the memory indicating that first route is associated with the second multipath group and the second route is associated with the first multipath group.

3. The device of claim 2, wherein:
   the first multipath group is associated with a first plurality of hash value ranges;
   the second multipath group is associated with a second plurality of hash value ranges;
   each hash range of the first plurality of hash value ranges and each hash range of the second plurality of hash value ranges correspond to an interface of the plurality of interfaces;
   wherein the processing logic is configured to:
      compute a hash value for each network packet of the network packets; and
      based on whether the each network packet is received from the first route or the second route, forward the each network packet based on a relationship between the hash value of the each network packet and one of the first plurality of hash value ranges or the second plurality of hash value ranges.

4. The device of claim 3, wherein the processing logic is determine a destination address for the each network packet and to determine whether the each network packet is received from the first route or the second route based on the destination address.

5. The device of claim 2, further comprising a plurality of queues coupled with the plurality of interfaces;
   wherein the plurality of queues are configured to store data representing at least some of the network packets to be output by the plurality of interfaces;
   wherein the processing logic is configured to determine that the first interface is congested based on statistical information associated with the data stored in the plurality of queues.

6. The device of claim 5, wherein the processing logic is configured to determine that the first interface is congested based on part of the statistical information associated with a first flow of network packets stored in the plurality of queues, the first flow of network packets being received from the same source and having the same destination.

7. The device of claim 6, wherein the statistical information include:
   a first count to indicate a first number of times network packets of the first flow of network packets are forwarded to the first interface within a time period;
   a route identifier associated with the first count, the route identifier to identify a route selected for the first flow of network packets; and
   a multipath group identifier to identify a multipath group, the multipath group being associated with the first count and with the route identifier;
   wherein the processing logic is configured to:
      determine that the first count exceeds a first threshold;
      identify the first route based on the route identifier associated with the first count;

identify the first multipath group based on the multipath group identifier associated with the first count and with the first route; and dissociate the first route from the first multipath group based on identifying the first route and the first multipath group.

8. The device of claim 7, wherein the processing logic is configured to, based on determining that a number of network packets represented by the data stored in a queue of the plurality of queues exceeds a second threshold, update the statistical information for the number of network packets.

9. The device of claim 8, wherein the statistical information include a second count indicating a second number of times network packets of a second flow of network packets are forwarded to the first interface within the time period; and wherein the processing logic is configured to:
identify two flows of network packets including the first flow of network packets and a second flow of network packets contributing the most network packets to the queue within the time period;
based on determining that the first route is selected for the first flow of network packets and the second flow of network packets, updating the first count and the second count.

10. The device of claim 9, wherein the processing logic is configured to determine that the first interface is congested based on determining that at least one of the first count or the second count exceeds the first threshold.

11. The device of claim 7, wherein the processing logic is configured to create the second multipath group based on determining that the first count exceeds the first threshold.

12. The device of claim 11, wherein the first multipath group is associated with a first plurality of hash ranges, each of the first plurality of hash ranges being associated with an interface of the plurality of interfaces;

wherein the processing logic is further configured to:
generate a second plurality of hash ranges as a copy of the first plurality of hash ranges;
identify a first hash range associated with the first interface from the second plurality of hash ranges;
split the first hash range into a second hash range and a third hash range;
merge the second hash range with a fourth hash range of the second plurality of hash ranges to form an updated fourth hash range, the fourth hash range being associated with a second interface of the plurality of interfaces; and
associate the second plurality of hash ranges including the third hash range and the updated fourth hash range with the second route.

13. The device of claim 12, wherein the processing logic is further configured to:
remove an association between a first route identifier of the first route and a first multipath group identifier of the first multipath group in the statistical information; and
add an association between a second route identifier of the second route and a second multipath group identifier of the second multipath group in the statistical information.

14. The device of claim 1, further comprising:
clean-up logic configured to periodically determine if a multipath group has become stale and, upon determining that the multipath group has become stale, delete the stale multipath group.

15. The device of claim 1, wherein the device further comprises:
a processor, digital signal processor (DSP), a field programmable gate array (FPGA), an application specific integrated circuit (ASIC), System on a Chip (SoC), or a programmable logic device (PLD).

16. The device of claim 1, wherein the processing logic is configured to dissociate a first route from the first multipath group and to associate the first route with the second multipath group such that a first network packet associated the first route is routed to a second interface of the plurality of interfaces based on the second way instead of the first interface based on the first way.

17. The device of claim 16, wherein the processing logic is configured to dissociate the first route based on determining that network packets associated the first route congests the first interface.

18. A method comprising:
storing, at a memory, a first multipath group associated with a plurality of interfaces, the first multipath group being associated with a first way of distributing network packets among the plurality of interfaces; and
upon determining that a first interface of the first multipath group is congested:
creating a second multipath group, the second multipath group being associated with a second way of distributing the network packets among the plurality of interfaces, the second way being different from the first way;
storing the second multipath group together with the first multipath group in the memory; and
distributing the network packets among the plurality of interfaces based on the first way and the second way associated with, respectively, the first multipath group or the second multipath group.

19. The method of claim 18, further comprising:
storing, in the memory, a routing table comprising a first route and a second route;
storing, in the memory, first information indicating that the first route and the second route are associated with the first multipath group; and
upon determining that an interface of the first multipath group is congested:
dissociating the first route from the first multipath group;
associating the first route with the second multipath group; and
storing second information in the memory to indicate that first route is associated with the second multipath group and the second route is associated with the first multipath group.

20. The method of claim 19, wherein:
the first multipath group is associated with a first plurality of hash value ranges;
the second multipath group is associated with a second plurality of hash value ranges;
each hash range of the first plurality of hash value ranges and each hash range of the second plurality of hash value ranges correspond to an interface of the plurality of interfaces;
wherein the method further comprises:
computing a hash value for each network packet of the network packets; and
based on whether the each network packet is received from the first route or the second route, forwarding the each network packet based on a relationship between the hash value of the each network packet and one of the first plurality of hash value ranges or the second plurality of hash value ranges.

21. The method of claim 19, further comprising: creating the second multipath group based on determining that an interface of the first multipath group is congested.

22. The method of claim 21, further comprising: determining the second way based on the first way.

* * * * *